(12) United States Patent
Lee

(10) Patent No.: US 12,498,538 B2
(45) Date of Patent: Dec. 16, 2025

(54) LENS DRIVING DEVICE, CAMERA MODULE, AND OPTICAL DEVICE HAVING A HOUSING WITH A GROOVE

(71) Applicant: LG INNOTEK CO., LTD., Seoul (KR)

(72) Inventor: Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 146 days.

(21) Appl. No.: 18/348,429

(22) Filed: Jul. 7, 2023

(65) Prior Publication Data
US 2023/0350157 A1 Nov. 2, 2023

Related U.S. Application Data

(63) Continuation of application No. 17/453,602, filed on Nov. 4, 2021, now Pat. No. 11,740,430, which is a
(Continued)

(30) Foreign Application Priority Data

Nov. 3, 2015 (KR) .................. 10-2015-0153720
Dec. 10, 2015 (KR) .................. 10-2015-0175731
Dec. 10, 2015 (KR) .................. 10-2015-0175733

(51) Int. Cl.
*G02B 7/09* (2021.01)
*G02B 7/08* (2021.01)
(Continued)

(52) U.S. Cl.
CPC .............. *G02B 7/09* (2013.01); *G02B 7/08* (2013.01); *G02B 27/646* (2013.01); *G03B 3/10* (2013.01);
(Continued)

(58) Field of Classification Search
CPC .......... G02B 27/646; G02B 7/08; G02B 7/09; G03B 13/36; G03B 17/08;
(Continued)

(56) References Cited

U.S. PATENT DOCUMENTS 5,682,097 A 10/1997 Bryant et al.
5,978,161 A 11/1999 Lemke
(Continued)

FOREIGN PATENT DOCUMENTS

CN 102455481 A 5/2012
CN 102879973 A 1/2013
(Continued)

OTHER PUBLICATIONS

International Search Report in International Application No. PCT/KR2016/012441, filed Nov. 1, 2016.
(Continued)

*Primary Examiner* — Antoinette T Spinks
(74) *Attorney, Agent, or Firm* — SALIWANCHIK, LLOYD & EISENSCHENK

(57) ABSTRACT

The present embodiment relates to a lens driving device comprising: a housing; a bobbin disposed inside the housing; and a lower elastic member provided on the lower side of the bobbin and coupled to the bobbin and to the housing, wherein the lower elastic member comprises a first outer portion, which is coupled to the housing, a second outer portion, which is coupled to the housing and is spaced from the first outer portion, a first inner portion, which is coupled to the bobbin, a second inner portion, which is coupled to the bobbin and is spaced from the first inner portion, a first elastic portion, which connects the first outer portion and the first inner portion, a second elastic portion, which connects the second outer portion and the second inner portion, and
(Continued)

an inner connecting portion, which connects the first inner portion and the second inner portion.

20 Claims, 17 Drawing Sheets

Related U.S. Application Data continuation of application No. 16/747,864, filed on Jan. 21, 2020, now Pat. No. 11,194,121, which is a continuation of application No. 15/772,461, filed as application No. PCT/KR2016/012441 on Nov. 1, 2016, now Pat. No. 10,578,829.

(51) Int. Cl.

| | |
|---|---|
| *G02B 27/64* | (2006.01) |
| *G03B 3/10* | (2021.01) |
| *G03B 5/00* | (2021.01) |
| *G03B 13/36* | (2021.01) |
| *G03B 17/08* | (2021.01) |
| *H02K 33/00* | (2006.01) |
| *H02K 41/035* | (2006.01) |
| *H04N 23/54* | (2023.01) |
| *H04N 23/55* | (2023.01) |
| *H04N 23/57* | (2023.01) |
| *H04N 23/68* | (2023.01) |

(52) U.S. Cl.
CPC .............. *G03B 5/00* (2013.01); *G03B 13/36* (2013.01); *G03B 17/08* (2013.01); *H02K 33/00* (2013.01); *H02K 41/0356* (2013.01); *H04N 23/54* (2023.01); *H04N 23/55* (2023.01); *H04N 23/57* (2023.01); *H04N 23/687* (2023.01); *G03B 2205/0007* (2013.01); *G03B 2205/0069* (2013.01)

(58) Field of Classification Search
CPC .... G03B 2205/0007; G03B 2205/0069; G03B 3/10; G03B 5/00; H02K 33/00; H02K 41/0356; H04N 23/54; H04N 23/55; H04N 23/57; H04N 23/687
See application file for complete search history.

(56) References Cited

U.S. PATENT DOCUMENTS

| | | | |
|---|---|---|---|
| 9,151,963 B2 * | 10/2015 | Sato | ............... H04N 23/54 |
| 11,194,121 B2 | 12/2021 | Lee | |
| 2008/0304154 A1 | 12/2008 | Lee | |
| 2011/0096178 A1 | 4/2011 | Ryu et al. | |
| 2012/0082442 A1 | 4/2012 | Kwon et al. | |
| 2012/0200176 A1 | 8/2012 | Park | |
| 2013/0050828 A1 * | 2/2013 | Sato | ............... H04N 23/54 |
| | | | 359/557 |
| 2013/0170055 A1 | 7/2013 | Yu | |
| 2014/0072289 A1 | 3/2014 | Lim et al. | |
| 2014/0307114 A1 | 10/2014 | Kim | |
| 2015/0103195 A1 | 4/2015 | Kwon et al. | |
| 2015/0253583 A1 | 9/2015 | Cho et al. | |
| 2016/0316121 A1 | 10/2016 | Park | |

FOREIGN PATENT DOCUMENTS

| | | |
|---|---|---|
| CN | 102955324 A | 3/2013 |
| CN | 103269414 A | 8/2013 |
| CN | 104216199 A | 12/2014 |
| CN | 104570547 A | 4/2015 |
| CN | 104808416 A | 7/2015 |
| CN | 204515213 U | 7/2015 |
| CN | 104902149 A | 9/2015 |
| JP | 2011-113009 A | 6/2011 |
| JP | 2012-113141 A | 6/2012 |
| JP | 2013-024938 A | 2/2013 |
| JP | 2013-156496 A | 8/2013 |
| KR | 10-2012-0027751 A | 3/2012 |
| KR | 10-2015-0042681 A | 4/2015 |
| KR | 10-2015-0050080 A | 5/2015 |
| WO | 2015/102382 A1 | 7/2015 |

OTHER PUBLICATIONS

Notice of Allowance dated Oct. 21, 2019 in U.S. Appl. No. 15/772,461.
Office Action dated Mar. 20, 2020 in Chinese Application No. 201680063974.1.
Office Action dated Sep. 30, 2020 in U.S. Appl. No. 16/747,864.
Office Action dated Apr. 15, 2021 in U.S. Appl. No. 16/747,864.
Notice of Allowance dated Aug. 4, 2021 in U.S. Appl. No. 16/747,864.
Office Action dated Nov. 7, 2022 in Korean Application No. 10-2015-0153720.
Office Action dated Nov. 28, 2022 in Korean Application No. 10-2015-0175733.
Office Action dated Nov. 28, 2022 in Korean Application No. 10-2015-0175731.
Office Action dated Jan. 5, 2023 in Chinese Application No. 202110836492.8.
Office Action dated Jan. 11, 2023 in Chinese Application No. 202110836491.3.
Office Action dated Dec. 28, 2022 in U.S. Appl. No. 17/453,602.
Notice of Allowance dated Apr. 7, 2023 in U.S. Appl. No. 17/453,602.

* cited by examiner

LENS DRIVING DEVICE, CAMERA MODULE, AND OPTICAL DEVICE HAVING A HOUSING WITH A GROOVE

CROSS-REFERENCE TO RELATED APPLICATIONS

This application is a continuation of U.S. application Ser. No. 17/453,602, filed Nov. 4, 2021; which is a continuation of U.S. application Ser. No. 16/747,864, filed Jan. 21, 2020, now U.S. Pat. No. 11,194,121, issued Dec. 7, 2021; which is a continuation of U.S. application Ser. No. 15/772,461, filed Apr. 30, 2018, now U.S. Pat. No. 10,578,829, issued Mar. 3, 2020; which is the U.S. national stage application of International Patent Application No. PCT/KR2016/012441, filed Nov. 1, 2016, which claims priority to Korean Application Nos. 10-2015-0153720, filed Nov. 3, 2015; 10-2015-0175733, filed Dec. 10, 2015; and 10-2015-0175731, filed Dec. 10, 2015, the disclosures of each of which are incorporated herein by reference in their entirety.

TECHNICAL FIELD

The teachings in accordance with exemplary and non-limiting embodiments of this invention relate generally to a lens driving device, a camera module, and an optical device.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to prompt various types of circumferential devices or additional equipment to be mounted on mobile terminals.

Inter alia, camera modules may be representative items photographing an object in a still picture or a video. Recently, camera modules equipped with auto focusing function capable of automatically adjusting a focus in response to a distance to a subject have been manufactured. Meantime, the camera modules equipped with the auto focus function generally include an elastic member movably supporting a bobbin relative to a housing.

On the other hand, the conventional camera modules having the auto focus function include a plurality of legs in which elastic members independently and mutually are disposed. In this case, the conventional camera modules suffer from disadvantages in that a fine force may be generated on some or all of the plurality of legs in the manufacturing processes including a process of coupling an elastic member to a bobbin and/or a housing. Particularly, when a bending is generated on some or all of the plurality of legs, a serious problem occurs where a static tilt is generated in which a tilt (lean) occurs on the bobbin under an initial state where no current is supplied to the camera module.

Furthermore, there is another problem where the elastic member is twisted in a process of coupling an elastic member to a housing. In addition, the conventional camera modules having handshake correction (OIS: Optical Image Stabilization) function are disposed with a plurality of lateral support units, where each of the plurality of lateral support units is inserted into a separate hole of a housing. However, the conventional camera modules suffer from disadvantages in that an operation time loss is generated in a process of coupling the plurality of lateral support units to the housing.

DETAILED DESCRIPTION OF THE INVENTION

Technical Subject

In order to solve the abovementioned problems/disadvantages, exemplary embodiments of the present invention provide a lens driving device including a plurality of legs free from individual trembling.

Furthermore, exemplary embodiments of the present invention provide a lens driving device configured to minimize a twisting (or warp) of elastic member in a fusing process, which is a process of coupling an elastic member to a housing.

Still furthermore, exemplary embodiments of the present invention provide a lens driving device including a structure configured to shorten an assembly time between a housing and a lateral support member.

Still furthermore, exemplary embodiments of the present invention provide a camera module including the lens driving device and an optical device.

Technical Solution

In one general aspect of the present invention, there is provided a lens driving device comprising: a housing; a bobbin so disposed inside of the housing as to move to a first direction; a first coil disposed at an outer circumferential surface of bobbin; a driving magnet disposed at the housing to face the first coil; a base disposed underneath the housing; a substrate including a circuit member having a second coil so disposed as to face the driving magnet between the housing and the base; an upper elastic member disposed at an upper side of the bobbin to be coupled to the bobbin and the housing; and a bottom elastic member disposed at a bottom side of the bobbin to be coupled to the bobbin and the housing, wherein the bottom elastic member includes a first outer portion coupled to the housing, and a second outer portion coupled to the housing and spaced apart from the first outer portion, a first inner portion coupled to the bobbin and a second inner portion coupled to the bobbin and spaced apart from the first inner portion, a first elastic portion connecting the first outer portion to the first inner portion, a second elastic portion connecting the second outer portion to the second inner portion, and an inner connection portion connecting the first inner portion to the second inner portion.

Preferably, but not necessarily, the bottom elastic member may further include an outer connection portion connecting the first outer portion to the second outer portion.

Preferably, but not necessarily, at least one portion of the outer connection portion may be disposed at an outside of the driving magnet.

Preferably, but not necessarily, the bobbin may include, at an inside thereof, an upper/bottom opened lens receptor, and the inner connection portion may be formed in a circular shape, and an inner diameter of the inner connection portion may correspond to a diameter of the lens receptor.

Preferably, but not necessarily, the bottom elastic member may further include a third outer portion and a fourth outer portion coupled to the housing, a third inner portion and a fourth inner portion coupled to the bobbin, and a third elastic portion connecting the third outer portion and the third inner portion, and a fourth elastic portion connecting the fourth outer portion and the fourth inner portion, wherein the inner connection portion connects the first to fourth inner portions.

Preferably, but not necessarily, each of the first outer portion and the second outer portion may be disposed at an edge portion side of the housing.

Preferably, but not necessarily, the housing may include first to third lateral portions, each continuously and adjacently disposed, a first edgy portion disposed between the first lateral portion and the second lateral portion, and a second edge portion interposed between the second lateral portion and the third lateral portion, wherein the first outer portion may be disposed nearer to the first edge portion than the second edge portion, and the first inner portion may be disposed nearer to the second edge portion than the first edge portion.

Preferably, but not necessarily, the first outer portion may include a first insertion hole inserted by a first lug of the housing, a second insertion hole inserted by a second lug of the housing and spaced apart from the first insertion hole, and a connection hole connecting the first insertion hole and the second insertion hole, wherein a width of the connection hole may be smaller than a width of the first insertion hole and a width of the second insertion hole.

Preferably, but not necessarily, at least one portion of connection hole may be disposed with a fused area of any one or more of the first lug and the second lug.

Preferably, but not necessarily, the first inner portion may include a coupling hole inserted by a coupling lug of the bobbin, and a rotation prevention hole inserted by a rotation prevention lug of the bobbin and spaced apart from the coupling hole, wherein the rotation prevention lug may be disposed at a farther outside than the coupling lug, and the coupling lug may be fused while being inserted into the coupling hole.

Preferably, but not necessarily, the lens driving device further comprises: a sensing magnet disposed at the bobbin; and a sensor disposed at the housing to detect the sensing magnet, wherein the upper elastic member may include first to sixth elastic units, each and mutually spaced apart from the other, and wherein the first and second elastic units may be electrically connected to the first coil and the third to sixth elastic units may be electrically connected to the sensor.

Preferably, but not necessarily, the lens driving device further comprises:
a support member coupled to the upper elastic member and the substrate, wherein the support member may include first to sixth wires coupled to the first to sixth elastic units, each of the first to sixth wires being paired to each of the first to sixth elastic units.

Preferably, but not necessarily, the lens driving device further comprises: a guide portion protruded from an upper surface of the housing, wherein the guide portion may be disposed on at least one discrete space out of a plurality of discrete spaces among the third to sixth elastic units.

In another general aspect of the present invention, there is provided a camera module, comprising: a PCB (Printed Circuit Board); an image sensor coupled to the PCB; a housing; a bobbin so disposed as to move to a first direction at an inside of the housing; a first coil disposed at an outer circumferential surface of the bobbin; a driving magnet disposed at the housing to face the first coil; a base interposed between the housing and the PCB; a substrate including a circuit member having a second coil to face the driving magnet between the housing and the base; an upper elastic member disposed at an upper side of the bobbin to be coupled to the bobbin and the housing, and a bottom elastic member disposed at a bottom side of the bobbin to be coupled to the bobbin and the housing, wherein the bottom elastic member includes a first outer portion coupled to the housing, and a second outer portion coupled to the housing and spaced apart from the first outer portion, a first inner portion coupled to the bobbin and a second inner portion coupled to the bobbin and spaced apart from the first inner portion, a first elastic portion connecting the first outer portion to the first inner portion, a second elastic portion connecting the second outer portion to the second inner portion, and an inner connection portion connecting the first inner portion to the second inner portion.

In still another general aspect of the present invention, there is provided an optical device comprising a main body, a camera module photographing a subject, and a display portion disposed at one surface of main body to output an image photographed by the camera module, wherein the camera module includes: a PCB (Printed Circuit Board); an image sensor coupled to the PCB; a housing; a bobbin so disposed as to move to a first direction at an inside of the housing; a first coil disposed at an outer circumferential surface of the bobbin; a driving magnet disposed at the housing to face the first coil; a base interposed between the housing and the PCB; a substrate including a circuit member having a second coil to face the driving magnet between the housing and the base; an upper elastic member disposed at an upper side of the bobbin to be coupled to the bobbin and the housing, and a bottom elastic member disposed at a bottom side of the bobbin to be coupled to the bobbin and the housing, wherein the bottom elastic member includes a first outer portion coupled to the housing, and a second outer portion coupled to the housing and spaced apart from the first outer portion, a first inner portion coupled to the bobbin and a second inner portion coupled to the bobbin and spaced apart from the first inner portion, a first elastic portion connecting the first outer portion to the first inner portion, a second elastic portion connecting the second outer portion to the second inner portion, and an inner connection portion connecting the first inner portion to the second inner portion.

A lens driving device according to an exemplary embodiment of the present invention may include: a bobbin; a first driving portion disposed at the bobbin; a housing disposed at an outside of the bobbin; a second driving portion disposed at the housing to face the first driving portion; and a first support member coupled to the bobbin and housing; wherein the first support member includes a first outer portion coupled to the housing, a second outer portion coupled to the housing to be spaced apart from the first outer portion, a first inner portion coupled to the bobbin, a second inner portion coupled to the bobbin to be spaced apart from the first inner portion, a first elastic portion connecting the first outer portion to the first inner portion, a second elastic portion connecting the second outer portion to the second inner portion, and an inner connection portion connecting the first inner portion and the second inner portion.

Preferably, but not necessarily, the bobbin may include, at an inside thereof, an upper/bottom-opened lens receptor, wherein the inner connection portion may be formed in a circular shape, and an inner diameter of the inner connection portion may correspond to a diameter of the lens receptor.

Preferably, but not necessarily, the first support member may further include an outer connection portion connecting the first outer portion and the second outer portion.

Preferably, but not necessarily, at least some of the outer connection portion may be disposed at an outside of the second driving portion.

Preferably, but not necessarily, the first outer portion may include a first insertion hole inserted by a first lug of the housing, a second insertion hole inserted by a second lug of the housing and spaced apart from the first insertion hole, and a connection hole connecting the first insertion hole and the second insertion hole, wherein width of the connection hole may be smaller than that of the first insertion hole and the second insertion hole.

Preferably, but not necessarily, at least some of the connection hole may be disposed with any one or more of fused areas with the first lug and the second lug.

Preferably, but not necessarily, the first inner portion may include a coupling hole inserted by a coupling lug of the bobbin, and a rotation prevention hole inserted by a rotation prevention lug of bobbin and spaced apart from the coupling hole, wherein the rotation prevention lug may be disposed farther outside of the coupling lug, and the coupling lug may be fused while being inserted into the coupling hole.

Preferably, but not necessarily, the housing may include first to third side portions, each continuously and adjacently disposed, a first edge portion interposed between the first side portion and the second side portion, and a second edge portion interposed between the second side portion and the third side portion, wherein the first outer portion may be disposed nearer to the first edge portion than the second edge portion, and the first inner portion may be disposed nearer to the second edge portion than the first edge portion.

Preferably, but not necessarily, the housing may include first to fourth side portions, each continuously and adjacently disposed, a first edge portion interposed between the first side portion and the second side portion, a second edge portion interposed between the second side portion and the third side portion, a third edge portion interposed between the third side portion and the fourth side portion, and a fourth edge portion interposed between the fourth side portion and the first side portion, wherein the first outer portion may be disposed at a first edge portion side, and the second outer portion may be disposed at a second edge portion side, and wherein the support member may further include a third outer portion disposed at a third edge portion side and a fourth outer portion disposed at a fourth edge portion side.

Preferably, but not necessarily, the lens driving device may further comprise: a second support member coupled to an upper surface of bobbin and to an upper surface of housing; a sensing magnet mounted on the bobbin; and a sensor disposed on the housing to detect the sensing magnet, wherein the first support member may be coupled to a lower surface of bobbin and to a lower surface of housing, and the second support member may include first to sixth elastic units, each spaced apart, the first and second elastic units may be electrically connected to the first driving portion and the third to sixth elastic units may be electrically connected to the sensor.

Preferably, but not necessarily, the camera module according to an exemplary embodiment may include: a bobbin; a first driving portion disposed at the bobbin; a housing disposed at an outside of the bobbin; a second driving portion disposed at the housing to face the first driving portion; and a first support member coupled to the bobbin and the housing; wherein the first support member may include a first outer portion coupled to the housing, a second outer portion coupled to the housing to be spaced apart from the first outer portion, a first inner portion coupled to the bobbin, a second inner portion coupled to the bobbin to be spaced apart from the first inner portion, a first elastic portion connecting the first outer portion to the inner portion, a second elastic portion connecting the second outer portion to the second inner portion, and an inner connection portion connecting the first inner portion to the second inner portion.

Preferably, but not necessarily, an optical device according to an exemplary embodiment of the present invention may comprise: a bobbin; a first driving portion disposed at the bobbin; a housing disposed at an outside of the bobbin; a second driving portion disposed at the housing to face the first driving portion; and a first support member coupled to the bobbin and the housing; wherein the first support member may include a first outer portion coupled to the housing, a second outer portion coupled to the housing to be spaced apart from the first outer portion, a first inner portion coupled to the bobbin, a second inner portion coupled to the bobbin to be spaced apart from the first inner portion, a first elastic portion connecting the first outer portion to the inner portion, a second elastic portion connecting the second outer portion to the second inner portion, and an inner connection portion connecting the first inner portion to the second inner portion.

Preferably, but not necessarily, a lens driving device according to an exemplary embodiment of the present invention may comprise: a housing; a first driving portion disposed at the housing; a bobbin disposed at an inside of the housing; a second driving portion disposed at the bobbin to face the first driving portion; and a support member coupled to any one or more of the housing and the bobbin to support the bobbin relative to the housing, wherein the support member may include a first support unit coupled to a first surface of the housing, and a second support unit coupled to a first surface of the housing to be spaced apart from the first support unit, and wherein the housing may include a guide portion protruded from the first surface to between the first support unit and the second support unit.

Preferably, but not necessarily, the guide portion may directly contact any one or more of the first support unit and the second support unit.

Preferably, but not necessarily, the guide portion may include a partition portion disposed between the first support unit and the second support unit, and an extension portion extended from an outer end of the partition portion along an outer circumference of the housing.

Preferably, but not necessarily, the partition portion may include a first partition portion and a second partition portion spaced apart from the first partition portion.

Preferably, but not necessarily, the first support unit may include a first round portion in which corners are formed to be round, and the guide portion may include a second round portion having a curvature corresponding to that of the first round portion.

Preferably, but not necessarily, the guide portion may be disposed at an area where a distance between the first support unit and the second support unit is the shortest in a space between the first support unit and the second support unit.

Preferably, but not necessarily, a height of the guide portion from the first surface may be greater than a thickness of the first support unit and the second support unit.

Preferably, but not necessarily, the lens driving device may further comprise third to sixth support units coupled to the first surface of housing; a sensing magnet disposed at the bobbin and a sensor portion disposed at the housing to detect the sensing magnet, wherein the first to sixth support units are mutually spaced apart, and the first to fourth support units may be electrically connected to the sensor portion, and the fifth and sixth support units may be electrically connected to the second driving portion.

Preferably, but not necessarily, the housing may further include a first lug protruded from the first surface and a second lug protruded from the first surface to be spaced apart from the first lug, wherein the first support unit may include a first hole coupled to the first lug and a second hole coupled to the second lug.

Preferably, but not necessarily, the housing may further include a first lug protruded from the first surface, and the first support unit may include a first hole coupled to the first lug, and a cut-off portion extended from the first hole, and the first lug may be fused while being coupled to the first hole to accommodate at least some portion of cut-off portion.

Preferably, but not necessarily, a camera module according to an exemplary embodiment of the present invention may comprise: a housing; a first driving portion disposed at the housing; a bobbin disposed at an inside of the housing; a second driving portion disposed at the bobbin to face the first driving portion; and a support member coupled to any one or more of the housing and the bobbin to support the bobbin relative to the housing, wherein the support member include a first support unit coupled to a first surface of the housing, a second support unit coupled to the first surface of housing to be spaced apart from the first support unit, and wherein the housing includes a guide portion protruded from the first surface to protrude between the first support unit and the second support unit.

Preferably, but not necessarily, an optical device according to an exemplary embodiment of the present invention may comprise: a housing; a first driving portion disposed at the housing; a bobbin disposed at an inside of the housing; a second driving portion disposed at the bobbin to face the first driving portion; and a support member coupled to any one or more of the housing and the bobbin to support the bobbin relative to the housing, wherein the support member include a first support unit coupled to a first surface of the housing, a second support unit coupled to the first surface of housing to be spaced apart from the first support unit, and wherein the housing includes a guide portion protruded from the first surface to protrude between the first support unit and the second support unit.

Preferably, but not necessarily, a lens driving device according to an exemplary embodiment of the present invention may comprise: a housing; a first driving portion disposed at the housing; a base disposed at a lower side of the housing; a second driving portion disposed at the base to face the first driving portion; and first and second side support units each spaced apart from the other; a side support member supported at one side by the housing and supported by the base at the other side; and a support member receptor disposed at the housing to accommodate the side support member, wherein the first and second side support units are disposed at the support member receptor to contact a damping portion.

Preferably, but not necessarily, the first and second side support units may be so disposed as to show an area accommodated in the support member receptor of the first and second side support units when viewed from a side of the housing.

Preferably, but not necessarily, the support member receptor may include a first staircase portion so formed as to be more relatively protruded at a lower surface than an upper surface, and the damping portion may be coated on an upper surface of the first staircase portion.

Preferably, but not necessarily, the side support member may further include third to eighth side support units, wherein the housing includes first to fourth edge portions formed by four side portions, and wherein the support member receptor include a first receptor part disposed at the first edge portion, a second receptor part disposed at the second edge portion, a third receptor part disposed at the third edge portion and a fourth receptor part disposed at the fourth edge portion, and wherein each two of the first to eighth side support units is respectively disposed at the first to fourth receptor parts.

Preferably, but not necessarily, the first receptor part may be formed with a first receptor groove accommodated in the first side support unit and a second receptor groove accommodated into the second side support unit, wherein the support member receptor include a partition wall interposed between the first receptor groove and the second receptor groove, and wherein at least some areas of an outer surface of the partition wall may be disposed at farther inner side of the first side support unit and the second side support unit, or disposed on a same planar surface, and the outer surface of the partition wall may be formed with a second staircase portion more protrusively formed at a lower surface than at an upper surface.

Preferably, but not necessarily, the first receptor part may include a first receptor groove accommodated by the first side support unit, wherein the first receptor groove may include an inclination portion in which at least some areas of the first receptor groove grow greater at a width from an upper side to a lower side.

Preferably, but not necessarily, the first receptor part may include a first receptor groove accommodated by the first side support unit, and a third staircase portion so stair-cased as to allow a width at an upper surface of the first receptor groove to be greater than a width at a lower surface of the first receptor groove.

Preferably, but not necessarily, the lens driving device may further comprise: a bobbin disposed at an inside of the housing; a third driving portion disposed at the bobbin to face the first driving portion; and an upper support member coupled to an upper surface of the bobbin and to an upper surface of the housing, wherein the side support member may be coupled at one side to the upper support member and coupled at the other side to the third driving portion.

Preferably, but not necessarily, the lens driving device may further comprise: a sensing magnet disposed at the bobbin; a sensor disposed at the housing to detect the sensing magnet; and a substrate mounted with the sensor and disposed at an upper surface of the housing, wherein the upper support member may include first to sixth upper support units, each discrete from the other, and wherein the first to second upper support units may be electrically connected to the third driving portion and the third to sixth upper support units may be electrically connected to the substrate.

Preferably, but not necessarily, the side support member may further include third to sixth side support units, wherein the first to sixth side support units may be electrically connected to the first to sixth upper support units by being paired to each other in an numerical order.

A camera module according to an exemplary embodiment of the present invention may comprise: a housing; a first driving portion disposed at the housing; a base disposed at a lower side of the housing; a second driving portion disposed at the base to face the first driving portion; a side support member including first and second side support units, supported at one side by the housing and supported at the other side by the base; and a support member receptor portion disposed at the housing to accommodate the side support member, wherein the first and second side support units may contact a damping portion by being disposed at the support member receptor portion.

An optical device according to an exemplary embodiment of the present invention may comprise: a housing; a first driving portion disposed at the housing; a base disposed at a lower side of the housing; a second driving portion disposed at the base to face the first driving portion; a side support member including first and second side support units, supported at one side by the housing and supported at the other side by the base; and a support member receptor portion disposed at the housing to accommodate the side support member, wherein the first and second side support units may contact a damping portion by being disposed at the support member receptor portion.

Advantageous Effects

The present exemplary embodiment can minimize a static tilt of bobbin generated by bending of a plurality of legs at an elastic member. Furthermore, a phenomenon of an elastic member being twisted in the course of being coupled by a fusing process of a housing can be minimized.

In addition, when an elastic member is used with a conductive line, a phenomenon of an elastic member being twisted by a coupling process between the elastic member and other members can be minimized. Furthermore, a short-circuit phenomenon can be inhibited that is caused by mutual contacts among a plurality of discretely-disposed elastic members. Still furthermore, an assembly time between a housing and a side support member can be shortened. Still furthermore, a working hour loss during damping works of a damper coated on a housing and a side elastic member can be reduced to thereby simplify curing of a damper.

BEST MODE

Figure 1:
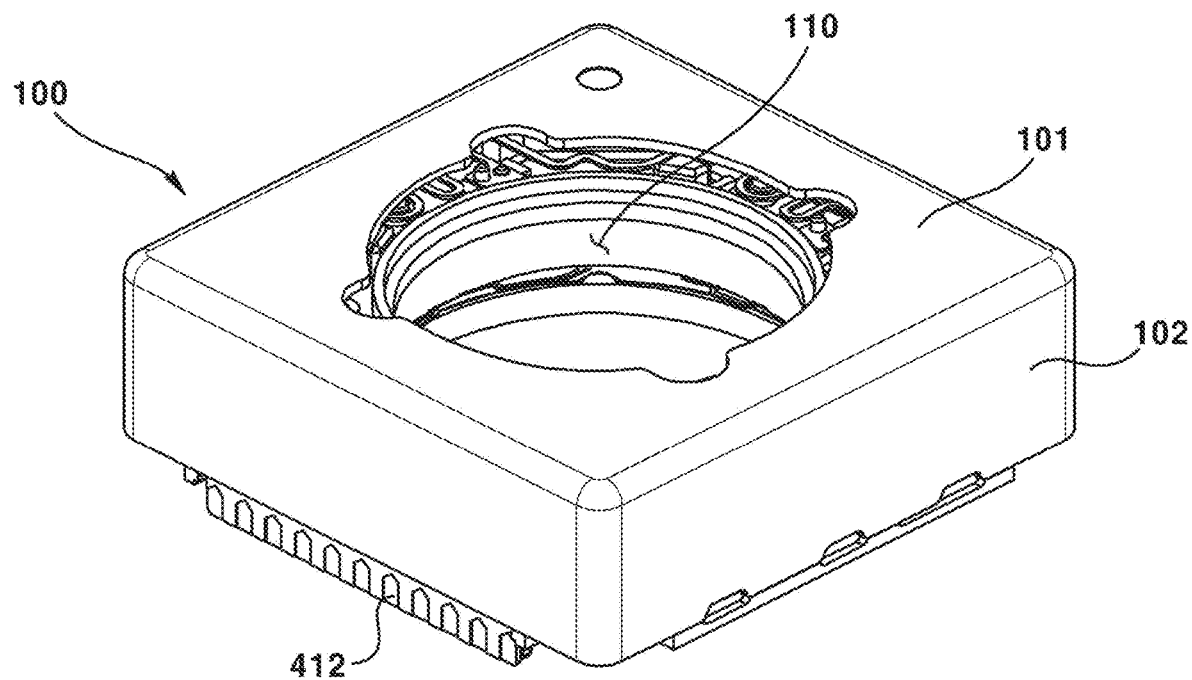
FIG. 1 is a perspective view illustrating a lens driving device according to a first exemplary embodiment of the present invention.

Some of the exemplary embodiments of the present invention will be described with the accompanying drawings. Throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter may be defined as an optical axis direction of a lens module in a state of being coupled to a lens driving device. Meantime, the "optical axis direction" may be interchangeably used with "vertical direction" and "z axis direction" and the like.

An "auto focus function" as used hereinafter may be defined as a function of automatically matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an outer force. Meantime, the "handshake correction" may be interchangeably used with an "OIS (Optical Image Stabilization)".

Any one of AF driving coil (220), a driving magnet (320) and an OIS driving coil (422) may be called a "first driving portion", another one may be called a "second driving portion" and a remaining one may be called a "third driving portion". Meantime, the AF driving coil (220), the driving magnet (320) and the OIS driving coil (422) may be arranged by mutually and interchangeably changing a position thereof.

Any one of AF driving coil (220) and the OIS driving coil (422) may be called a "first coil", and remaining one may be called a "second coil". Any one of the driving magnet (320), a sensing magnet (715) and a compensation magnet (716) may be called a "first magnet", another one may be called a "second magnet", and a remaining one may be called a "third magnet".

Now, a configuration of an optical device according to an exemplary embodiment of the present invention will be described hereinafter.

The optical device may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical device may include a main body (not shown), a camera module and a display portion (not shown). However, any one or more of the main body, the camera module and the display portion may be omitted or changed.

The main body may form an exterior look of an optical device. For example, the main body may include a look of a cubic shape. For another example, the main body may be formed in a round shape on at least some portions thereof. The main body may accommodate a camera module. The main body may be arranged at one surface with a display portion. For example, the display portion and the camera module may be disposed at one surface of the main body and a camera module may be additionally disposed at the other surface (surface opposite to the one surface) of main body.

The camera module may be disposed at the main body. The camera module may be disposed at one surface of the main body. At least some portions of the camera module may be accommodated into the main body. The camera module may be formed in a plural number. The plurality of camera modules may be respectively disposed at one surface of the main body and the other surface of the main body. The camera module may photograph an image of a subject.

The display portion may be disposed at the main body. The display portion may be disposed at one surface of main body. That is, the display portion may be arranged on a same surface as that of the camera module. Alternatively, the display portion may be disposed at the other surface of main body. The display portion may be disposed at a surface on the main body opposite to a surface arranged with the camera module. The display portion may output an image photographed by the camera module.

Now, configuration of camera module according to an exemplary embodiment of the present invention will be described.

The camera module may include a lens driving device, a lens module (not shown), an infrared cut-off filter (not shown), a PCB (Printed Circuit Board, not shown), an image sensor (not shown), and a controller (not shown). However, any one or more of the lens driving device, the lens module, the infrared cut-off filter, the PCB, the image sensor, and the controller may be omitted or changed from the camera module.

The lens module may include at least one or more lenses. The lens module may include a lens and a lens barrel. The lens module may include one or more lenses (not shown) and a lens barrel accommodating the lenses. However, one element of the lens module is not limited by the lens barrel, and any holder structure capable of supporting one or more lenses will suffice. The lens module may be coupled to an inside of the lens driving device, The lens module may be coupled to a bobbin (210) of lens driving device. The lens module may integrally move with the bobbin (210). The lens module may be coupled to the bobbin (210) using an adhesive (not shown). The lens module may be screw-coupled with the bobbin (210), for example. Meantime, a light having passed the lens module may be irradiated on an image sensor.

The infrared cut-off filter may serve to inhibit a light of infrared ray region from entering an image sensor. The infrared cut-off filter may be interposed between a lens module and an image sensor, for example. The infrared cut-off filter may be disposed at a holder member (not shown) separately formed independent from a base (430). However, the infrared cut-off filter may be installed at a hollow hole (431) of the base (430). The infrared cut-off filter may be formed with a film material or a glass material. The infrared cut-off filter may be formed by allowing an infrared cut-off coating material to be coated on a plate-shaped optical filter such as an imaging plane protection cover glass or a cover glass, for example. The infrared cut-off filter may be an infrared absorption filter absorbing an infrared ray. For another example, the infrared cut-off filter may be an infrared reflection filter reflecting an infrared ray.

A lens driving device may be disposed at an upper surface of a PCB. The PCB may be disposed at a lower surface of the lens driving device. The PCB may be coupled with the lens driving device. The PCB may be mounted with an image sensor. The PCB may be electrically connected to the image sensor. A holder member may be interposed between the PCB and the lens driving device, for example. At this time, the holder member may accommodate an image sensor at an inside thereof. In another example, the lens driving device may be directly disposed at the PCB. At this time, an inside of the lens driving device may accommodate the image sensor. Through this configuration, a light having passed the lens module coupled to the lens driving device may be irradiated on the image sensor disposed at the PCB. The PCB may supply a power (current) to the lens driving device. Meantime, the PCB may be disposed with a controller for controlling the lens driving device.

The image sensor may be mounted on the PCB. The image sensor may be electrically connected to the PCB. For example, the image sensor may be coupled to the PCB using an SMT (Surface Mounting Technology). In another example, the image sensor may be coupled to the PCB using a flip chip technology. The image sensor may be so disposed as to match the lens module in terms of optical axis. That is, an optical axis of image sensor and an optical axis of lens module may be aligned, through which the image sensor can obtain a light having passed the lens module. The image sensor may convert the light irradiated to an effective image area of image sensor to an electrical signal. The image sensor may be any one of a CCD (charge coupled device), an MOS (metal oxide semi-conductor), a CPD and a CID, for example. However, the types of image sensor are not limited thereto, and any configuration capable of converting an incident light to an electrical signal may be permitted.

The controller may be mounted on a PCB. The controller may be disposed at an inside of the lens driving device, for example. In another example, the controller may be also disposed at an outside of the lens driving device. The controller may individually control a direction, intensity and an amplitude of a current supplied to the AF driving coil (220) and the OIS driving coil (422) of lens driving device. The controller may perform any one of an AF function and an OIS function of the camera module by controlling the lens driving device. That is, the controller may move the lens module to an optical axis direction or tile the lens module to a direction orthogonal to the optical axis direction by controlling the lens driving device. Furthermore, the controller may perform any one or more feedback controls in the AF function and OIS function.

To be more specific, the controller may perform the auto focus feedback control by controlling a current supplied to the AF driving coil (220) by receiving a position of the bobbin (210) and/or the housing (310) detected by a sensor portion (700). Furthermore, the controller may perform the OIS feedback control by controlling a current supplied to the OIS driving coil (422) by receiving a position of the bobbin (210) and/or the housing (310) detected by a sensor portion (700). The abovementioned feedback control by the controller is generated in real time to allow performing more accurate auto focus and OIS functions.

Hereinafter, configuration of lens driving device will be described in detail according to a first exemplary embodiment of the present invention in reference to the accompanying drawings.

Figure 2:
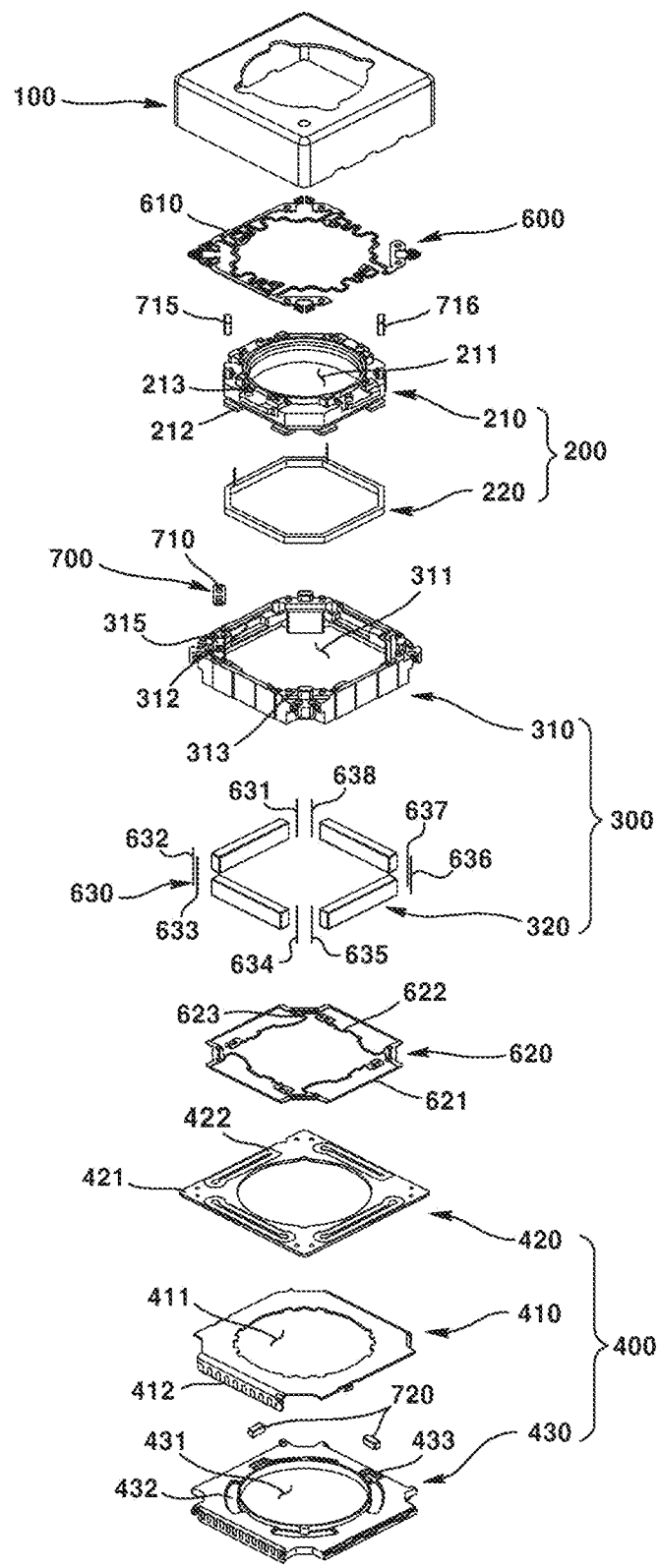
FIG. 2 is an exploded perspective view illustrating a lens driving device according to a first exemplary embodiment of the present invention.
Figure 3:
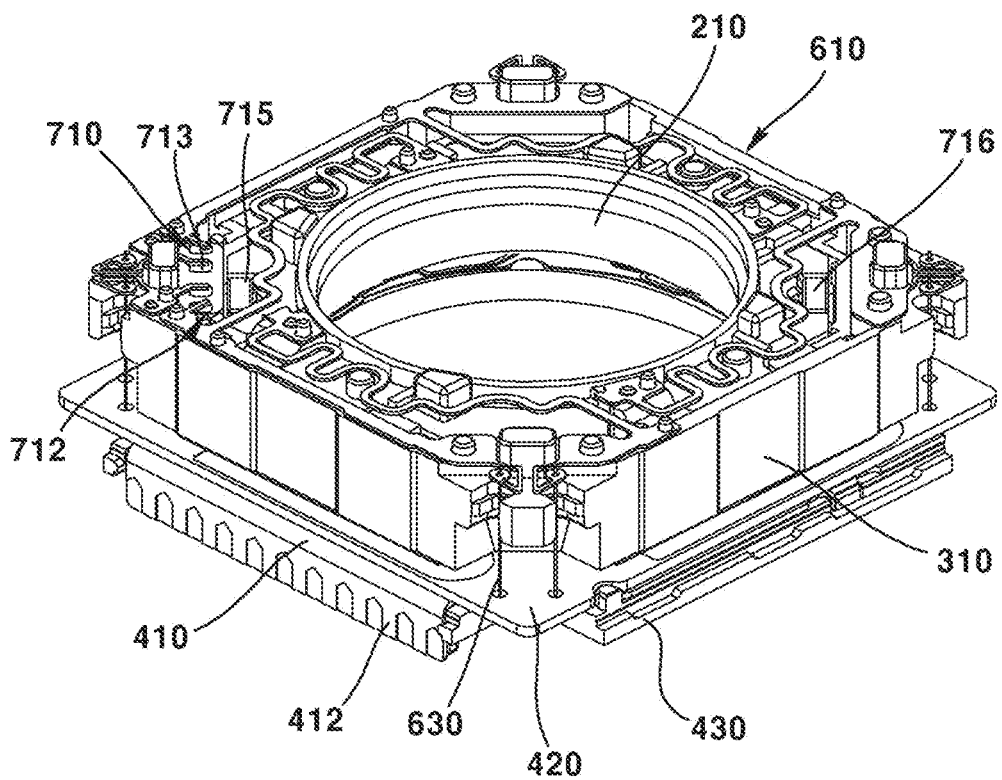
FIG. 3 is a perspective view illustrating a state where a cover member of FIG. 1 is omitted.
Figure 4:
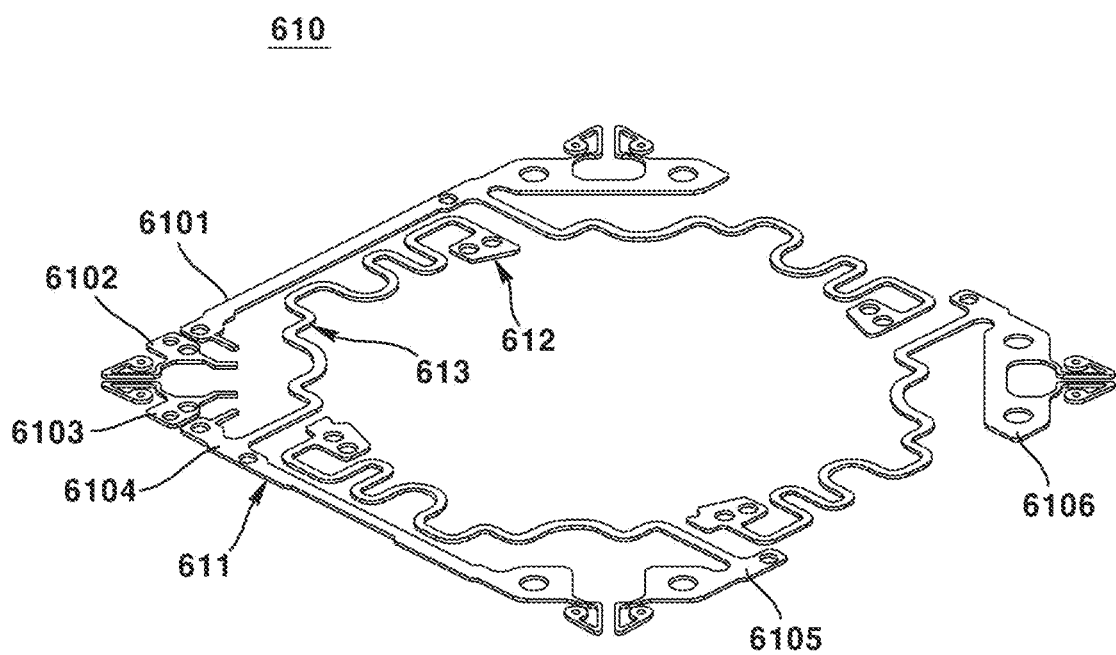
FIG. 4 is a perspective view illustrating an upper elastic member of a lens driving device according to a first exemplary embodiment of the present invention.
Figure 5:
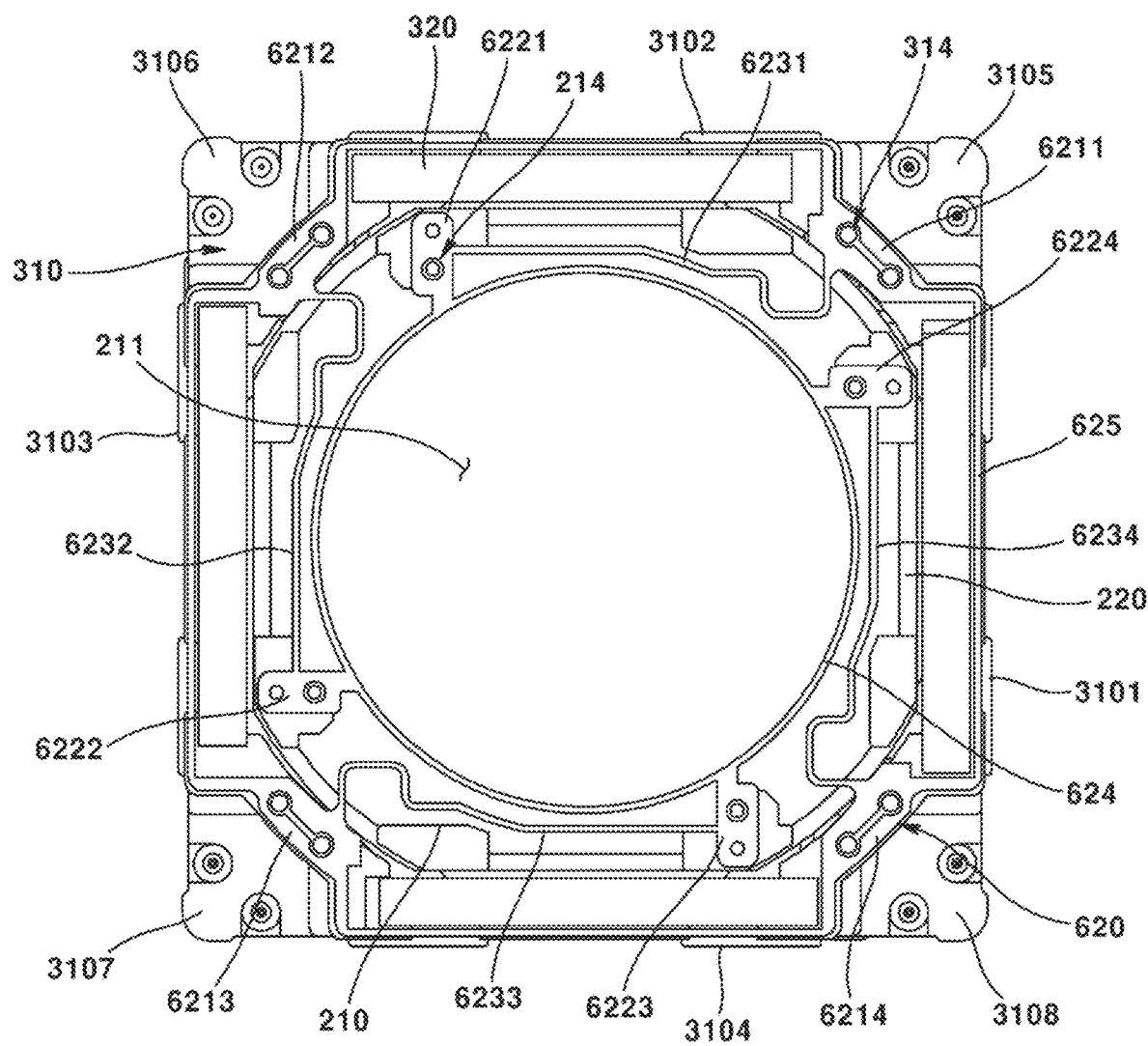
FIG. 5 is a bottom view illustrating some elements of a lens driving device according to a first exemplary embodiment of the present invention.
Figure 6:
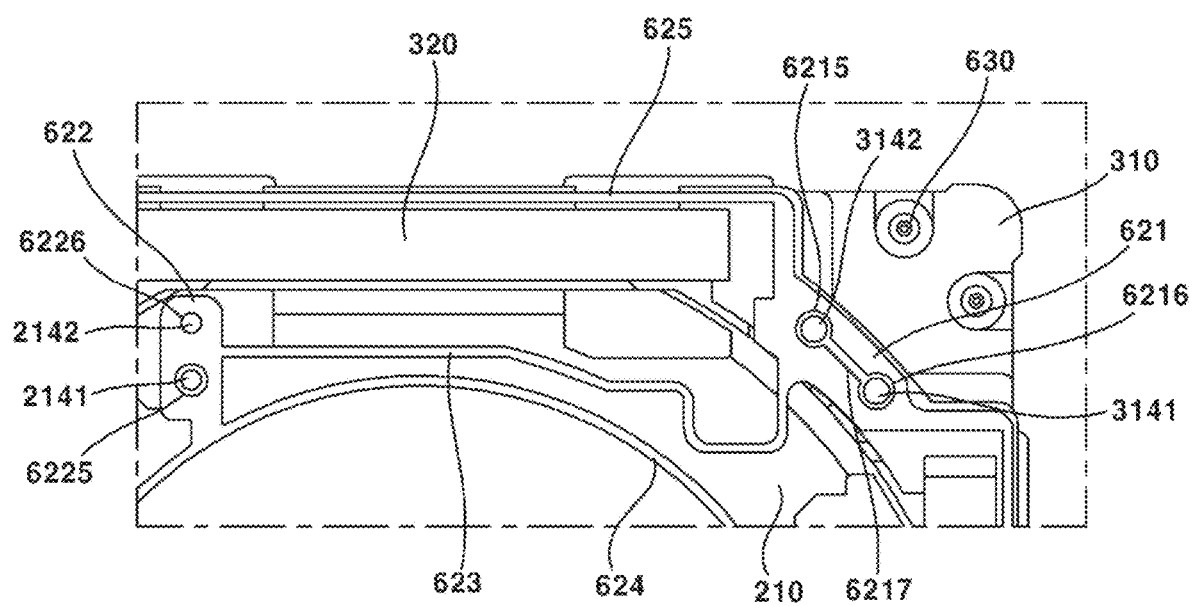
FIG. 6 is a partially expanded view illustrating some elements in FIG. 5 being expanded.

FIG. 1 is a perspective view illustrating a lens driving device according to a first exemplary embodiment of the present invention, FIG. 2 is an exploded perspective view illustrating a lens driving device according to a first exemplary embodiment of the present invention, FIG. 3 is a perspective view illustrating a state where a cover member of FIG. 1 is omitted, FIG. 4 is a perspective view illustrating an upper elastic member of a lens driving device according to a first exemplary embodiment of the present invention, FIG. 5 is a bottom view illustrating some elements of a lens driving device according to a first exemplary embodiment of the present invention, and FIG. 6 is a partially expanded view illustrating some elements in FIG. 5 being expanded.

The lens driving device according to the first exemplary embodiment of the present invention may include a cover member (100), a first mover (200), a second mover (300), a stator (400), a support member (600) and a sensor portion (700). However, the lens driving device according to the first exemplary embodiment of the present invention may omit any one of the cover member (100), the first mover (200), the second mover (300), the stator (400), the support member (600) and the sensor portion (700). Inter alia, the sensor portion (700) may be omitted because the sensor portion (700) is an element for AF feedback function and/or OIS feedback function.

The cover member (100) may form an exterior look of lens driving device. The cover member (100) may take a bottom-opened cubic shape. However, the shape of the cover member (100) is not limited thereto. The cover member (100) may include a non-magnetic body. When the cover member (100) is formed with a non-magnetic body, a magnetic force of the cover member (100) may affect any one or more of a driving magnet (320), a sensing magnet (715) and a compensation magnet (716). The cover member (100) may be formed with a metal material. To be more specific, the cover member (100) may be formed with a metal plate. In this case, the cover member (100) may inhibit shield an EMI (Electromagnetic Interference). Because of this characteristic, the cover member (100) may be called an "EMI shield can". The cover member (100) may inhibit electric waves generated from outside of the lens driving device from entering an inside of the cover member (100). Furthermore, the cover member (100) may inhibit the electric waves generated from inside of the cover member (100) from being emitted to outside of the cover member (100).

The cover member (100) may include an upper plate (101) and a lateral plate (102). The cover member (100) may include an upper plate (101) and a lateral plate (102) extended from an outer periphery of the upper plate (101) to a bottom side. For example, the cover member (100) may be coupled to a base (430). Some portions of the lateral plate (102) at the cover member (100) may be coupled to the base (430). A bottom end of the lateral plate (102) of the cover member (100) may be disposed at a staircase portion of the base (430). An inner lateral surface of the lateral plate (102) at the cover member may directly contact an outer lateral surface of the base (430). An inner lateral surface of the lateral plate (102) at the cover member may be coupled to the base (430) using an adhesive. In another example, the cover member (100) may be directly coupled to an upper surface of PCB. An inner space formed between the cover member (100) and the base (430) may be disposed with the first mover (200), the second mover (300), the stator (400) and the support member (600). Through this structure, the cover member (100) can protect inner elements from external shocks and simultaneously to inhibit introduction of external foreign objects.

The cover member (100) may include an opening (110). The opening (110) may be formed at the upper plate (101) of the cover member (100). The opening (110) may expose the lens module to an upper side. The opening (110) may be formed in a shape corresponding to that of the lens module. The size of opening (110) may be formed greater than that of a diameter of the lens module in order to allow the lens module to be assembled through the opening (110). A light introduced through the opening (110) may pass through the lens module. At this time, the light having passed the lens module may be converted to an electrical signal by the image sensor to allow obtaining an image.

The first mover (200) may be coupled to a lens module, one of the constitutional elements of camera module {however, the lens module may be explained as one of the elements of the lens driving device}. The first mover (200) may be accommodated into an inside of the lens module. An inner peripheral surface of the first mover (200) may be coupled by an outer peripheral surface of the lens module. The first mover (200) may move integrally with the lens module through an interaction with the second mover (300) and/or with the stator (400). At this time, the first mover (200) may integrally move with the lens module. Meantime, the first mover (200) may move in order to perform an auto focus function. At this time, the first mover (200) may be called an "AF mover". However, the present description is not limiting the first mover (200) as a member moving only for the auto focus function. The first mover (200) may move for OIS function.

The first mover (200) may include a bobbin (210) and an AF driving coil (220). However, any one or more of the bobbin (210) and the AF driving coil (220) may be omitted or changed from the first mover (200).

The bobbin (210) may be coupled to an inside of the housing (310). The bobbin (210) may be disposed at a through hole (311) of the housing (310). The bobbin (210) may move to an optical axis direction based on the housing (310). The bobbin (210) may be so disposed at the through hole (311) of the housing (310) as to move along an optical axis. The bobbin (210) may be coupled to the lens module. An inner peripheral surface of bobbin (210) may be coupled by an outer peripheral surface of lens module. The bobbin (210) may be coupled by an AF driving coil (220). The outer peripheral surface of bobbin (210) may be coupled by the AF driving coil (220). A bottom surface of bobbin (210) may be coupled by the bottom elastic member (620). An upper surface of bobbin (210) may be coupled by an upper elastic member (610).

The bobbin (210) may include a through hole (211), a driving portion coupling portion (212), an upper coupling portion (213) and a bottom (lower) coupling portion (214). However, any one or more of the through hole (211), the driving portion coupling portion (212), the upper coupling portion (213) and the bottom coupling portion (214) may be omitted or changed from the bobbin (210).

The through hole (211) may be formed at an inside of the bobbin (210). The through hole (211) may take an upper/bottom opened shape. The through hole (211) may be coupled by the lens module. An inner peripheral surface of through hole (211) may be formed with a screw thread in a shape corresponding to that of a screw thread formed at an outer peripheral surface of the lens module. That is, the through hole (211) may be screw-connected by the lens module. An adhesive may be infused between the lens module and the bobbin (210). At this time, the adhesive may be an epoxy cured by any one or more of a UV, heat and laser. Furthermore, the lens module and the bobbin (210) may be adhered by a heat-curing epoxy.

The driving portion coupling portion (212) may be coupled by the AF driving coil (220). The driving portion coupling portion (212) may be formed at an outer peripheral surface of bobbin (210). The driving portion coupling portion (212) may be formed as a groove by allowing a portion of the outer peripheral surface of the bobbin (210) to be concavely and inwardly formed. At this time, the driving portion coupling portion (212) may be accommodated by at least some portion of the AF driving coil (220). The driving portion coupling portion (212) may be integrally formed with the outer peripheral surface of bobbin (210). For example, the driving portion coupling portion (212) may be continuously formed along the outer peripheral surface of bobbin (210). At this time, the driving portion coupling portion (212) may be wound with the AF driving coil (220). In another example, the driving portion coupling portion (212) may be formed in a plural number, each spaced apart from the other. At this time, the AF driving coil (220) may be also formed in a plural number, each spaced apart from the other, and each coupled to the driving portion coupling portion (212). In another example, the driving portion coupling portion (212) may be formed in an upper opened shape or a bottom opened shape. At this time, the AF driving coil (220) may be inserted and coupled to the driving portion coupling portion (212) through the opened area while being pre-wound state.

The upper coupling portion (213) may be coupled to the upper elastic member (610). The upper coupling portion (213) may be coupled to an inner peripheral surface of the upper elastic member (610). The upper coupling portion (213) may be protrusively and outwardly formed from an upper surface of bobbin (210). For example, a lug of the upper coupling portion (213) may be inserted and coupled to a groove or a hole at an inner peripheral surface (612) of the upper elastic member (610). At this time, the lug of the upper coupling portion (213) may be fused while being inserted into a hole of the inner peripheral surface (612) to fix the upper elastic member (610) between the fused lug and the upper surface of bobbin (210).

The bottom coupling portion (214) may be coupled to a bottom elastic member (620). The bottom coupling portion (214) may be coupled to an inner peripheral surface (622) of the bottom elastic member (620). The bottom coupling portion (214) may be downwardly and protrusively formed from a bottom surface of the bobbin (210). For example, a lug of the bottom coupling portion (214) may be inserted and coupled to a groove or a hole at an inner peripheral surface (622) of the bottom elastic member (620). At this time, the lug of the bottom coupling portion (214) may be fused while being inserted into a hole of the inner peripheral surface (622) to fix the bottom elastic member (620) between the fused lug and the bottom surface of bobbin (210).

The AF driving coil (220) may be disposed at the bobbin (210). The AF driving coil (220) may be disposed at an outer peripheral surface of bobbin (210). The AF driving coil (220) may be directly wound on the bobbin (210). The AF driving coil (220) may be so formed as to face a driving magnet (320). In this case, when a current is supplied to the AF driving coil (220) to generate a magnetic field about the AF driving coil (220), the AF driving coil (220) may be moved relative to the driving magnet (320) by an electromagnetic interaction between the AF driving coil (220) and the driving magnet (320). The AF driving coil (220) may electromagnetically interact with the driving magnet (320). The AF driving coil (220) may move the bobbin (210) to an optical axis direction relative to the housing (310) through the electromagnetic interaction with the driving magnet (320). For example, the AF driving coil (220) may be an integrally-formed single coil. For another example, the AF driving coil (220) may include a plurality of coils, each spaced apart from the other. The AF driving coil (220) may be formed with four (4) coils, each spaced apart. At this time, the four coils may be so disposed at an outer peripheral surface of bobbin (210) as to allow four coils to be disposed to form a 90° between adjacent two coils.

The AF driving coil (220) may include a pair of lead cables in order to supply a power. In this case, the pair of lead cables on the AF driving coil (220) may be electrically coupled to fifth and sixth upper elastic units (6105, 6106), which are divided elements of the upper elastic member (610). That is, the AF driving coil (220) may receive the power through the upper elastic member (610). To be more specific, the AF driving coil (220) may sequentially receive the power through the PCB, the substrate (410), the lateral (side) support member (630) and the upper elastic member (610) in that order.

The second mover (300) may accommodate, on an inside thereof, at least some areas of the first mover (200). The second mover (300) may move the first mover (200) or move along with the first mover (200). The second mover (300) may be moved through interaction with the stator (400). The second mover (300) may be moved for OIS function. At this time, the second mover (300) may be called a "OIS mover". The second mover (300) may integrally move with the first mover (200) when moving for OIS function. The second mover (300) may include a housing (310) and a driving magnet (320). However, any one or more of the housing (310) and the driving magnet (320) may be omitted or changed from the second mover (300).

The housing (310) may be disposed at an outside of the bobbin (210). The housing (310) may accommodate, on an inside, at least some areas of bobbin (210). For example, the housing (310) may include a cubic shape. The housing (310) may include four lateral surfaces, and four corner portions disposed between the four lateral surfaces. The housing (310) may be disposed with a driving magnet (320). For example, each of the four lateral surfaces at the housing (310) may be disposed with the driving magnet (320). At least a portion at an outer peripheral surface of the housing (310) may be formed in a shape corresponding to an inner peripheral surface of the lateral plate (102) of the cover member (100).

The housing (310) may be formed with an insulation material. The housing (310) may be formed with a material different from that of the cover member (100). The housing (310) may be formed in an injection-molded article in consideration of productivity. A lateral surface at an outside of the housing (310) may be spaced apart from a lateral surface at an inside of the lateral plate (102) of the cove member (100). The housing (310) may move at a discrete space between the housing (310) and the cover member (100) for OIS driving. An upper surface of housing (310) may be coupled by the upper elastic member (610). A bottom surface of housing (310) may be coupled by the bottom elastic member (620).

The housing (310) may include a through hole (311), a driving portion coupling portion (312), an upper coupling portion (313), a bottom coupling portion (314) and a sensor coupling portion (315). However, any one or more of the through hole (311), the driving portion coupling portion (312), the upper coupling portion (313), the bottom coupling portion (314) and the sensor coupling portion (315) may be omitted or changed from the housing (310).

The housing (310) may include first to fourth lateral portions (3101, 3102, 3103, 3104), each being continuously and adjacently arranged. The housing (310) may include a first edge portion (3105) disposed between the first lateral portion (3101) and the second lateral portion (3102), a second edge portion (3106) disposed between the second lateral portion (3102) and the third lateral portion (3103), a third edge portion (3107) disposed between the third lateral portion (3103) and the fourth lateral portion (3104), and a fourth edge portion (3108) disposed between the fourth lateral portion (3104) and the first lateral portion (3101).

The through hole (311) may be formed at the housing (310). The through hole (311) may be formed at an inside of the housing (310). The through hole (311) may be so formed as to vertically pass through the housing (310). The through hole (311) may be disposed with the bobbin (210). The through hole (311) may be movably arranged with the bobbin (210). The through hole (311) may be formed in a corresponding shape on at least one portion to that of the bobbin (210). An inner peripheral surface of the housing (310) forming the through hole (311) may be so formed as to be spaced apart from an outer peripheral surface of bobbin (210). However, the inner peripheral surface of the housing (310) forming the through hole (311) may be formed with a stopper inwardly protruded to mechanically restrict an optical axis movement of the bobbin (210).

The driving portion coupling portion (312) may be coupled by a driving magnet (320). The driving portion coupling portion (312) may be formed at the housing (310). The driving portion coupling portion (312) may be formed at an inner peripheral surface of housing (310). In this case, the driving portion coupling portion (312) is disposed with the driving magnet (320), and the AF driving coil (220) is disposed inwardly of the driving magnet (320). This structural configuration may provide an advantageous electromagnetic interaction between the driving magnet (320) and the AF driving coil (220). The driving portion coupling portion (312) may take a bottom-opened shape. In this case, an advantageous electromagnetic interaction may be implemented between the driving magnet (320) disposed at the driving portion coupling portion (312) and the OIS driving coil (422) disposed at a bottom side of the driving magnet (320).

The driving portion coupling portion (312) may be formed by a groove that is formed by an inner peripheral surface of the housing (310) being concavely formed toward an outside. The driving portion coupling portion (312) may be formed in a plural number. Meantime, each of the plurality of driving portion coupling portions may be accommodated by the driving magnet (320). For example, the driving portion coupling portion (312) may be divided to four (4) pieces. Each of the four driving portion coupling portions (312) may be disposed with the driving magnet (320). For example, the driving portion coupling portion (312) may be formed at a lateral surface of housing (310). In another example, the driving portion coupling portion (312) may be formed at a corner portion of housing (310).

The upper coupling portion (313) may be coupled to the upper elastic member (610). The upper coupling portion (313) may be coupled to an external portion (611) of the upper elastic member (610). The upper coupling portion (313) may be protrusively and upwardly formed from an upper surface of housing (310). For example, a lug of the upper coupling portion (313) may be coupled to a groove or a hole of the external portion (611) of the upper elastic member (610) by being inserted into the groove or the hole. At this time, the lug of the upper coupling portion (313) may be fused while being inserted into the hole of the external portion (611) to fix the upper elastic member (610) to an area between the fused lug and an upper surface of housing (310).

A bottom coupling portion (314) may be coupled to the bottom elastic member (620). The bottom coupling portion (314) may be coupled to an external portion (621) of the bottom elastic member (620). The bottom coupling portion (314) may be protrusively and downwardly formed from a bottom (lower) surface of housing (310). For example, a lug of the bottom coupling portion (314) may be coupled to a groove or a hole of the external portion (621) of the bottom elastic member (620) by being inserted into the groove or the hole. At this time, the lug of the bottom coupling portion (314) may be fused while being inserted into the hole of the external portion (621) to fix the bottom elastic member (620) to an area between the fused lug and a bottom surface of housing (310).

The sensor coupling portion (315) may be disposed with at least some portions of first sensor (not shown). The sensor coupling portion (315) may be formed at the housing (310). The sensor coupling portion (315) may be formed by a groove formed by allowing a portion of an upper surface at the housing (310) to be concavely recessed to a bottom side. At this time, the sensor coupling portion (315) may be accommodated by at least a portion of the first sensor. Furthermore, at least one portion of the sensor coupling portion (315) may be formed with a shape corresponding to that of the first sensor.

The driving magnet (320) may be disposed on the housing (310). The driving magnet (320) may be disposed at an outside of the AF driving coil (220). The driving magnet (320) may face the AF driving coil (220). The driving magnet (320) may implement an electromagnetic interaction with the AF driving coil (220). The driving magnet (320) may be disposed at an upper side of the OIS driving coil (422). The driving magnet (320) may face the OIS driving coil (422). The driving magnet (320) may implement an electromagnetic interaction with the OIS driving coil (422). The driving magnet (320) may be commonly used for auto focusing function and OIS function. However, the driving magnet (320) may include a plurality of magnets separately used for each of the auto focusing function and the OIS function.

For example, the driving magnet (320) may be disposed at a lateral surface of housing (310). At this time, the driving magnet (320) may be a flat plate magnet. The driving magnet (320) may have a flat plate shape. In another example, the driving magnet (320) may be arranged at a corner portion of the housing (310). At this time, the driving magnet (320) may be a corner magnet. The driving magnet (320) may take a cubic shape having a broader inner lateral surface than an outer lateral surface.

The driving magnet (320) may include a plurality of magnets, each spaced apart from the other. The driving magnet (320) may include four (4) magnets, each spaced apart from the other magnet. At this time, the four magnets may be disposed at the housing (310) to allow adjacent two magnets to form an angle of 90°. That is, the driving magnet (320) may be disposed at four lateral surfaces of housing (310) at an equidistant interval. In this case, an efficient use of inner volume of the housing (310) can be promoted. Furthermore, the driving magnet (320) may be adhered to the housing (310) using an adhesive.

The stator (400) may be disposed at a bottom side of housing (310). The stator (400) may be disposed at a bottom (lower) side of the second mover (300). The stator (400) may face the second mover (300). The stator (400) may movably support the second mover (300). The stator (400) may move the second mover (300). At this time, the first mover (200) may also move along with the second mover (300).

The stator (400) may include a substrate (410), a circuit member (420) and a base (430). However, any one or more of the substrate (410), the circuit member (420) and the base (430) may be omitted or changed from the stator (400).

The substrate (410) may supply a power to the OIS driving coil (422). The substrate (410) may be coupled to a circuit member (420). The substrate (410) may be coupled to a PCB disposed at a bottom side of the base (430). The substrate (410) may be disposed at a bottom surface of the circuit member (420). The substrate (410) may be disposed at an upper surface of base (430). The substrate (410) may be interposed between the circuit member and the base (430).

The substrate (410) may include a flexible PCB (FPCB, Flexible Printed Circuit Board). The substrate (410) may be partially bent. The substrate (410) may supply a power to the AF driving coil (220). For example, the substrate (410) may supply a power to the AF driving coil (220) through the lateral support member (630) and the upper elastic member (610). Furthermore, the substrate (410) may supply a power to a substrate (712) of the first sensor portion (710) through the lateral support member (630) and the upper elastic member (610). The power supplied to the substrate may be used to drive the first sensor.

The substrate (410) may include an opening portion (411) and a terminal portion (412). However, any one or more of the opening portion (411) and the terminal portion (412) may be omitted or changed from the substrate.

The opening portion (411) may be formed on the substrate (410). The opening portion (411) may be formed at a center of substrate (410). The opening portion (411) may be so formed as to pass through the substrate (410). The opening portion (411) may pass a light having passed the lens module. The opening portion (411) may be formed in a round shape. However, the opening portion (411) is not limited to a round shape.

The terminal portion (412) may be formed on the substrate (410). A portion of the substrate (410) may be downwardly bent to form the terminal portion (412). At least one portion of the terminal portion (412) may be exposed to an outside. The terminal portion (412) may be coupled to the PCB disposed at a bottom side of the base (430) by soldering. A bottom end of the terminal portion (412) may be directly contacted to the PCB. The terminal portion (412) may be disposed at a terminal coupling portion (434) of base (430).

The circuit member (420) may be disposed on the base (430). The circuit member (420) may be disposed on the substrate (410). The circuit member (420) may be disposed at an upper surface of substrate (410). The circuit member (420) may be disposed on a bottom side of the driving magnet (320). The circuit member (420) may be interposed between the driving magnet (320) and the base (430). The circuit member (420) may be coupled by the lateral support member (630). The circuit member (420) may movably support the second mover (300).

The circuit member (420) may include a substrate portion (421) and an OIS driving coil (422). However, any one or more of the substrate portion (421) and the OIS driving coil (422) may be omitted or changed from the circuit member (420).

The circuit portion (421) may be a circuit substrate. The substrate portion (421) may be an FPCB. The substrate portion (421) may be integrally formed with the OIS driving coil (422). The substrate portion (421) may be coupled by the second support member (600). The substrate portion (421) may be formed with a hole passed through by the lateral support member (630). A bottom surface of substrate portion (421) and a bottom end of the lateral support member (630) may be coupled by soldering. The substrate portion (421) may be formed with an opening portion. The substrate portion (421) may be formed with an opening portion passing through the substrate portion (421). The opening portion of the substrate portion (421) may be so formed as to correspond to an opening portion (411) of the substrate (410).

The OIS driving coil (422) may face the driving magnet (320). In this case, when a current is supplied to the OIS driving coil (422) to form a magnetic field about the OIS driving coil (422), the driving magnet (320) may move relative to the OIS driving coil (422) by an electromagnetic interaction between the OIS driving coil (422) and the driving magnet (320). The OIS driving coil (422) may perform an electromagnetic interaction with the driving magnet (320). The OIS driving coil (422) can move the housing (310) and the bobbin (210) to a direction perpendicular to an optical axis relative to the base (430) through an electromagnetic interaction with the driving magnet (320). The OIS driving coil (422) may include at least one coil. The OIS driving coil (422) may be an FP (Fine Pattern) coil integrally formed at the substrate portion (421). The OIS driving coil (422) may include a plurality of mutually-discrete coils. The OIS driving coil (422) may include four (4) mutually-discrete coils. At this time, the four coils may be disposed on the substrate portion (421) in order to allow two adjacent coils to form an angle of 90°. Meantime, each of the four coils may be independently and separately controlled. The OIS driving coil (422) may receive a power sequentially through the PCB, the substrate (410) and the substrate portion (421).

The base (430) may be disposed on a bottom surface of the substrate (410). An upper surface of base (430) may be disposed with the substrate (410). The base (430) may be disposed with the circuit member (420). The base (430) may be coupled with the cover member (100). The base (430) may be disposed at an upper surface of PCB. However, a separate holder member may be interposed between the base (430) and the PCB. The base (430) may perform a sensor holder function protecting an image sensor mounted on the PCB.

The base (430) may include a through hole (431), a foreign object collection portion (432) and a sensor coupling portion (433). However, any one or more of the through hole (431), the foreign object collection portion (432) and the sensor coupling portion (433) may be omitted or changed from the base (430).

The through hole (431) may be formed on the base (430). The through hole (431) may be so formed as to vertically pass through the base (430). The through hole (431) may be disposed with an infrared filter. However, the infrared filter may be coupled to a separate holder member disposed on a bottom surface of base (430). A light having passed the lens module through the through hole (431) may be incident on the image sensor. That is, the light having passed the lens module may be incident on the image sensor through the opening portion of circuit member (420), the opening portion of substrate (410) and the through hole (431) of base (430). That is, the light having passed the lens module may be incident on the image sensor by passing through the opening portion of circuit member (420), the opening portion (411) of substrate (410) and the through hole (431) of base (430). The through hole (431) may be so formed as to take a round shape. However, the shape of the through hole (431) is not limited thereto.

The foreign object collection portion (432) can collect foreign objects introduced into the lens driving device. The foreign object collection portion (432) may include a groove formed by allowing an upper surface of base (430) to be concaved downwardly, and an adhesive portion disposed on the groove. The adhesive may include an adhesive material. The foreign object introduced into the lens driving device may be adhered to the adhesive portion.

The sensor coupling portion (433) may be disposed with a second sensor (800). The sensor coupling portion (433) can accommodate at least a portion of a second sensor (720). The sensor coupling portion (433) may be formed by a groove formed by allowing an upper surface of base (430) to be recessed downwardly. The sensor coupling portion (433) may be formed by being spaced apart from the foreign object collection portion (432). The sensor coupling portion (433) may be formed with a plurality of grooves. For example, the sensor coupling portion (433) may be formed with two grooves. At this time, each of the two grooves may be disposed with the second sensor (720).

The support member (600) may connect more than two any elements in the first mover (200), the second mover (300) and the stator (400). The support member (600) may elastically connect more than any two elements of the first mover (200), the second mover (300) and the stator (400) to enable a relative movement between each element. The support member (600) may be formed with an elastic member. In this case, the support member (600) may be called "elastic member".

The support member (600) may include an upper elastic member (610), a bottom (lower) support member (620) and a lateral (side) support member (630). Here, any one of the upper elastic member (610) and the bottom elastic member (620) may be called "a first elastic member", and the remaining one may be called "a second elastic member".

The upper elastic member (610) may include an outer portion (611), an inner portion (612), an elastic portion (613), for example. The upper elastic member (610) may include an outer portion coupled to the housing (310), an inner portion coupled with the bobbin (210) and an elastic portion (613) elastically connecting the outer portion (611) and the inner portion (612).

The upper elastic member (610) may be connected to an upper surface of the first mover (200) and an upper surface of the second mover (300). To be more specific, the upper elastic member (610) may be coupled to an upper surface of bobbin (210) and an upper surface of housing (310). The inner portion (612) of upper elastic member (610) may be coupled to an upper coupling portion (213) of bobbin (210), and the outer portion of the upper elastic member (610) may be coupled to an upper coupling portion (313) of housing (310).

The upper elastic member (610) may be formed by being divided into six pieces, for example. At this time, four (4) pieces out of the six (6) upper elastic members may be electrically conducted to the first sensor portion (710) and remaining two pieces may be electrically conducted to the AF driving coil (220). In other words, the upper elastic member (610) may include mutually-discrete first to sixth upper elastic units (6101, 6102, 6103, 6104, 6105, 6106). At this time, the first to fourth upper elastic units (6101, 6102, 6103, 6104) may be electrically connected to the substrate (712). Furthermore, the fifth and sixth upper elastic units (6105, 6106) may be electrically connected to the AF driving coil (220). The first to fourth upper elastic units (6101, 6102, 6103, 6104) may be used to supply a power to the first sensor portion (710), and to transmit/receive information or signals between the controller and the first sensor portion (710). The fifth and sixth upper elastic units (6105, 6106) may be used to supply a power to the AF driving coil (220).

The bottom elastic member (620) may include an outer portion (621), and inner portion (622) and an elastic portion (623), for example. The bottom elastic member (620) may include an outer portion (621) coupled to the housing (310), and inner portion (622) coupled to the bobbin (210), and an elastic portion (623) elastically connecting the outer portion (621) and the inner portion (622).

The bottom elastic member (620) may be connected to a bottom surface of the first mover (200) and to a bottom surface of the second mover (300). To be more specific, the bottom elastic member (620) may be connected to a bottom surface of the bobbin (210) and to a bottom surface of housing (310). The inner portion (622) of the bottom elastic member (620) may be coupled by a bottom coupling portion (214) of bobbin (210), and the outer portion (621) of bottom elastic member (620) may be coupled by a bottom coupling portion (314) of housing (310).

The bottom elastic member (620) may be integrally formed, for example. However, the present invention is not limited thereto. In a modification, the bottom elastic member (620) may be formed by being divided to a pair to be used to supply a power to the first coil and the like.

The bottom elastic member (620) may include first to fourth outer portions (6211, 6212, 6213, 6214) coupled to the housing (310) and each spaced apart. The bottom elastic member (620) may include first to fourth inner portions (6221, 6222, 6223, 6224) coupled to the bobbin (210) and each spaced apart. The bottom elastic member (620) may include a first elastic portion (6231) connecting a first outer portion (6211) and a first inner portion (6221), a second elastic portion (6232) connecting a second outer portion (6212) and a second inner portion (6222), a third elastic portion (6233) connecting a third outer portion (6213) and a third inner portion (6223), and a fourth elastic portion (6234) connecting a fourth outer portion (6214) and a fourth inner portion (6224).

The first outer portion (6211) may be disposed at a first edge portion (3105) side. The second outer portion (6212) may be disposed at a second edge portion (3106) side. The third outer portion (6213) may be disposed at a third edge portion (3107) side. The fourth outer portion (6214) may be disposed at a fourth edge portion (3108) side. The first inner portion (6221) may be disposed at a second edge portion (3106) side. The second inner portion (6222) may be disposed at a third edge portion (3107) side. The third inner portion (6223) may be disposed at a fourth edge portion (3108) side. The fourth inner portion (6224) may be disposed at a first edge portion (3105) side.

The first outer portion (6211) may be disposed closer to the first edge (3105) than the second edge portion (3106). In this case, length of the first elastic portion (6231) may be formed to be longer than a case where both the first outer portion (6211) and the first inner portion (6221) are disposed at a first edge portion (3105) side. Thus, the first elastic portion (6231) according to an exemplary embodiment of the present invention can be manufactured with a broader width over a comparative exemplary embodiment while securing a necessary elasticity. Meanwhile, when the width of the elasticity portion is broadened, a defect ratio can be reduced because of being less affected by a manufacturing error.

The bottom (lower) elastic member (620) may include an inner connection portion (624) connecting the first inner portion (6221) and the second inner portion (6222). The bottom elastic member (620) may include an inner connection portion (624) connecting the first to fourth inner portions (6221, 6222, 6223, 6224). The inner connection portion (624) may connect the first to fourth inner portions (6221, 6222, 6223, 6224). The inner connection portion (624) may connect each distal end of the first to fourth inner portions (6221, 6222, 6223, 6224).

The inner connection portion (624) may connect each end of the first to fourth inner portions (6221, 6222, 6223, 6224). In this case, a phenomenon of generating a bending on any one or more of the first to fourth inner portions (6221, 6222, 6223, 6224) can be minimized over a case of being individually formed because the first to fourth inner portions (6221, 6222, 6223, 6224) are integrally formed. Furthermore the inner connection portion (624) can minimize a phenomenon of generating a rotation on any one or more of the first to fourth inner portions (6221, 6222, 6223, 6224).

The inner connection portion (624) may be formed in a ring shape. At this time, a minor diameter of inner connection portion (624) may correspond to a diameter of the lens receptor (211). The inner connection portion (624) may be so disposed as not to overlap with the lens receptor (211) to an optical axis direction. That is, the inner connection portion (624) may be so disposed as not to affect an optical path connecting from the lens module to the image sensor.

The bottom elastic member (620) may further include an outer connection portion (625) connecting the first outer portion (6211) to the second outer portion (6212). The bottom elastic member (620) may include an outer connection portion (625) connecting the first to fourth outer portions (6211, 6212, 6213, 6214). The outer connection portion (625) may connect the first to fourth outer portions (6211, 6212, 6213, 6214). The outer connection portion (625) may connect each distal end of the first to fourth outer portions (6211, 6212, 6213, 6214). The outer connection portion (625) may connect each end of the first to fourth outer portions (6211, 6212, 6213, 6214). In this case, a phenomenon of generating a bending on any one or more of the first to fourth outer portions (6211, 6212, 6213, 6214) can be minimized over a case of being individually formed because the first to fourth inner portions (6211, 6212, 6213, 6214) are integrally formed. Furthermore the outer connection portion (625) can minimize a phenomenon of generating a rotation on any one or more of the first to fourth inner portions (6211, 6212, 6213, 6214).

At least one portion of the outer connection portion (625) may be disposed at an outside of the driving magnet (320). The outer connection portion (625) may be so disposed as not to vertically overlap with the driving magnet (320). That is, the outer connection portion (625) may be so disposed as not to contact the driving magnet (320).

The first outer portion (6211) may include a first insertion hole (6215), a second insertion hole (6216) and a connection hole (6217). Furthermore, the first to fourth outer portions (6212, 6213, 6214) may also include a first insertion hole (6215), a second insertion hole (6216) and a connection hole (6217).

The outer portion (6211) may include a first insertion hole (6215) inserted by a first lug (3141) of the housing (310), a second insertion hole (6216) inserted by a second lug (3142) of the housing (310) and spaced apart from the first insertion hole (6215), and a connection hole (6217) connecting the first insertion hole (6215) and the second insertion hole (6216). That is, the first insertion hole (6215) may be inserted by the first lug (3141). The second insertion hole (6216) may be inserted by the second lug (3142). In other words, the first outer portion (6211) may be doubly coupled by the first lug (3141) and the second lug (3142) relative to the housing (310). The connection hole (6217) may connect the first insertion hole (6215) and the second insertion hole (6216). A width of connection hole (6217) may be smaller than that of the first insertion hole (6215) and that of the second insertion hole (6216). At least one portion of the connection hole (6217) may be disposed with a fused area of more than any one of the first lug (3141) and the second lug (3142), through which a phenomenon of the first outer portion (6211) being rotated can be inhibited.

The first inner portion (6221) may include a coupling hole (6225) and a rotation prevention hole (6226). Furthermore, the second to fourth inner portions (6222, 6223, 6224) may also include a coupling hole (6225) and a rotation prevention hole (6226).

The first inner portion (6221) may include a coupling hole (6225) inserted by a coupling lug (2141) of bobbin (210), and a rotation prevention hole (6226) inserted by a rotation prevention lug (2142) of bobbin (210) and spaced apart from the coupling hole (6225). The rotation prevention lug (2142) may be disposed at a farther outside than the coupling lug (2141). The first inner portion (6221) may be inhibited from rotation because of being also fixed by the rotation prevention lug (2142) in addition to the coupling lug (2141) coupled by fusion relative to the bobbin (210).

The lateral support member (630) may be coupled at one side to the stator (400), and coupled at the other side to the upper elastic member (610) and/or housing (310). The lateral support member (630) may be coupled at one side to the stator (400) and coupled at the other side to the upper elastic member (610), for example. Furthermore, in another example, the lateral support member (630) may be coupled at one side to the stator (400) and coupled at the other side to the housing (310), through which the lateral support member (630) can elastically support the second move (300)

in order to allow the second mover (300) to horizontally move or tilt. The lateral support member (630) may include a plurality of wires, for example. Alternatively, the lateral support member (630) may include a plurality of leaf springs as a modification.

The lateral support member (630) may be electrically connected at an end of one side with the circuit member (420) and may be electrically connected at an end of the other side with the upper elastic member (610). The lateral support member (630) may be formed in the same number as that of the upper elastic member (610), for example. That is, the lateral support member (630) may be formed with six (6) pieces and may be respectively connected to the upper elastic member (610) formed with six (6) pieces. In this case, the lateral support member (630) may supply, to each piece of the upper elastic member (610), a power supplied from the stator (400) or from outside. The lateral support member (630) may be determined in the number thereof in consideration of symmetry, for example. The lateral support member (630) may be formed in a total of eight (8) pieces, each two pieces on the edge portion of the housing (310), for example. The lateral support member (630) may include first to eighth lateral support parts (631, 632, 633, 634, 635, 637, 638), each mutually spaced apart from the other. The first lateral support part (631) may be electrically connected to a first upper elastic unit (6101), the second lateral support part (632) may be electrically connected to a second upper elastic unit (6102), the third lateral support part (633) may be electrically connected to a third upper elastic unit (6103), the fourth lateral support part (634) may be electrically connected to a fourth upper elastic unit (6104), the fifth lateral support part (635) may be electrically connected to a fifth upper elastic unit (6105), and the sixth lateral support part (636) may be electrically connected to a sixth upper elastic unit (6106).

The lateral support member (630) or the upper elastic member (610) may include a shock absorption portion (not shown) for absorbing a shock, for example. The shock absorption portion may be disposed on at least any one or more of the lateral support member (630) and the upper elastic member (610). The shock absorption portion may be a separate member like a damper. Furthermore, the shock absorption portion may be realized through shape change of any one or more of the lateral support member (630) and the upper elastic member (610). That is, the shock absorption portion may be implemented by a portion of the lateral support member (630) or the upper elastic member (610) being bent in a zigzag manner, or in a coil spring shape manner.

The sensor portion (700) may be used for any one or more of the auto focusing feedback and OIS feedback. The sensor portion (700) may detect the position or movement of any one or more of the first mover (200) and the second mover (300).

The sensor portion (700) may include a first sensor portion (710) and a second sensor (720), for example. The first sensor portion (710) may provide information for AF feedback by sensing a vertical movement of bobbin relative to the housing (310). The second sensor (720) may provide information for OIS feedback by detecting a horizontal movement or tilt of second mover (300).

The first sensor portion (710) may include a first sensor, a substrate (712) and a sensing magnet (715), for example. The first sensor may be disposed on the housing (310). The first sensor may be disposed at an upper surface of housing (310). At this time, the sensing magnet (715) may be disposed at an upper surface of bobbin (210). The first sensor may be mounted on the substrate (712). The first sensor may be disposed on the housing (310) while being mounted on the substrate (712). The first sensor may detect the position or movement of bobbin (210). The first sensor may detect the position or movement of bobbin (210) by detecting the sensing magnet (715) disposed on the bobbin (210). The first sensor may be a Hall sensor detecting the magnetic force of a magnet, for example. However, the present invention is not limited thereto.

The substrate (712) may be mounted with a first sensor. The substrate (712) may be disposed on the housing (310). The substrate (712) may be electrically conducted to the upper elastic member (610), through which the substrate (712) may supply a power to the first sensor and transmit/receive information or signals from the controller. The substrate (712) may include a terminal portion (713). The terminal portion (713) may be electrically connected by the upper elastic member (610). To be more specific, four (4) terminals of the terminal portions (713) may be electrically connected to the first to fourth upper elastic units (6101, 6102, 6103, 6104) in a pair. The terminal portion (713) may be so arranged as to face an upper side, for example. However, the present invention is not limited thereto.

The sensing magnet (715) may be disposed on the bobbin (210). The lens driving device according to an exemplary embodiment of the present invention may further comprise a compensation magnet (716) disposed on the bobbin (210) and positioned symmetrically to the sensing magnet (715) based on a center of the bobbin (210). The compensation magnet (716) may be so arranged as to realize a magnetic force balance with the sensing magnet (715). That is, the compensation magnet (716) may be so arranged as to solve the magnetic force imbalance generated by the sensing magnet (715). The sensing magnet (715) may be disposed at one side of bobbin (210), and the compensation magnet (716) may be disposed at the other side of bobbin (210).

The second sensor (720) may be disposed on the stator (400). The second sensor (720) may be disposed at an upper surface or a bottom surface of substrate (410). The second sensor (720) may be disposed at a bottom surface of substrate (410) and positioned at a sensor accommodation portion (433) formed at the base (430). The second sensor (720) may include a Hall sensor, for example. In this case, the second sensor may sense a movement of second mover (300) relative to the stator (400) by sensing a magnetic field of the driving magnet (320). The second sensor (720) may be formed with more than two (2) pieces, for example, to detect both the x axis and y axis movements of the second mover (300). Meantime, the second sensor (720) may so positioned as not to vertically overlap with the OIS driving coil (422).

Hereinafter, an effect of lens driving device according to a first exemplary embodiment of the present invention will be described with reference to the accompanying drawings. Hereinafter, a 'leg' may be used in order to call both the inner portion (620) and the elastic portion (623) of the bottom elastic member (620).

In a modification according to a first exemplary embodiment of the present invention, as in the first exemplary embodiment of the present invention, the inner connection portion (624) connecting the first to fourth inner portions (6221, 6222, 6223, 6224) may be formed during the manufacturing and delivery of the product in order to inhibit shapes of first to fourth elastic portions (6231, 6232, 6233, 6234). However, in the modification in the first exemplary embodiment of the present invention, the inner connection portion (624) may be removed when a press process for coupling the bottom elastic member (620) to the bobbin (210) and the housing (310) is completed.

As mentioned in the first exemplary embodiment of the present invention disposed with an inner connection portion (624), when compared with the modification of the first exemplary embodiment removed of the inner connection portion (624), all end portions of four legs are all connected in the first exemplary embodiment of the present invention, such that legs are not individually swayed, but in the modification according to the first exemplary embodiment, each of the four legs may be swayed or moved. When the bottom elastic member (620) according to the modification of the first exemplary embodiment of the present invention is seen by being divided, albeit being difficult to ascertain by naked eye, there may be generated a fine miniscule bending of 10~20 μm, and in this case, there is a high probability of generating a static tilt due to imbalanced force of four legs. Particularly, in the modification of the first exemplary embodiment of the present invention, length of leg is long, such that there is a high risk of deformation at a start point {an area where the outer portion (621) and the elastic portion (623) meet} of leg. That is, the first exemplary embodiment of the present invention can minimize generation of static tilt by inhibiting deformation of legs which has been problematic in the modification.

Hereinafter, configuration of lens driving device according to a second exemplary embodiment of the present invention will be described with reference to the accompanying drawings.

Figure 7:
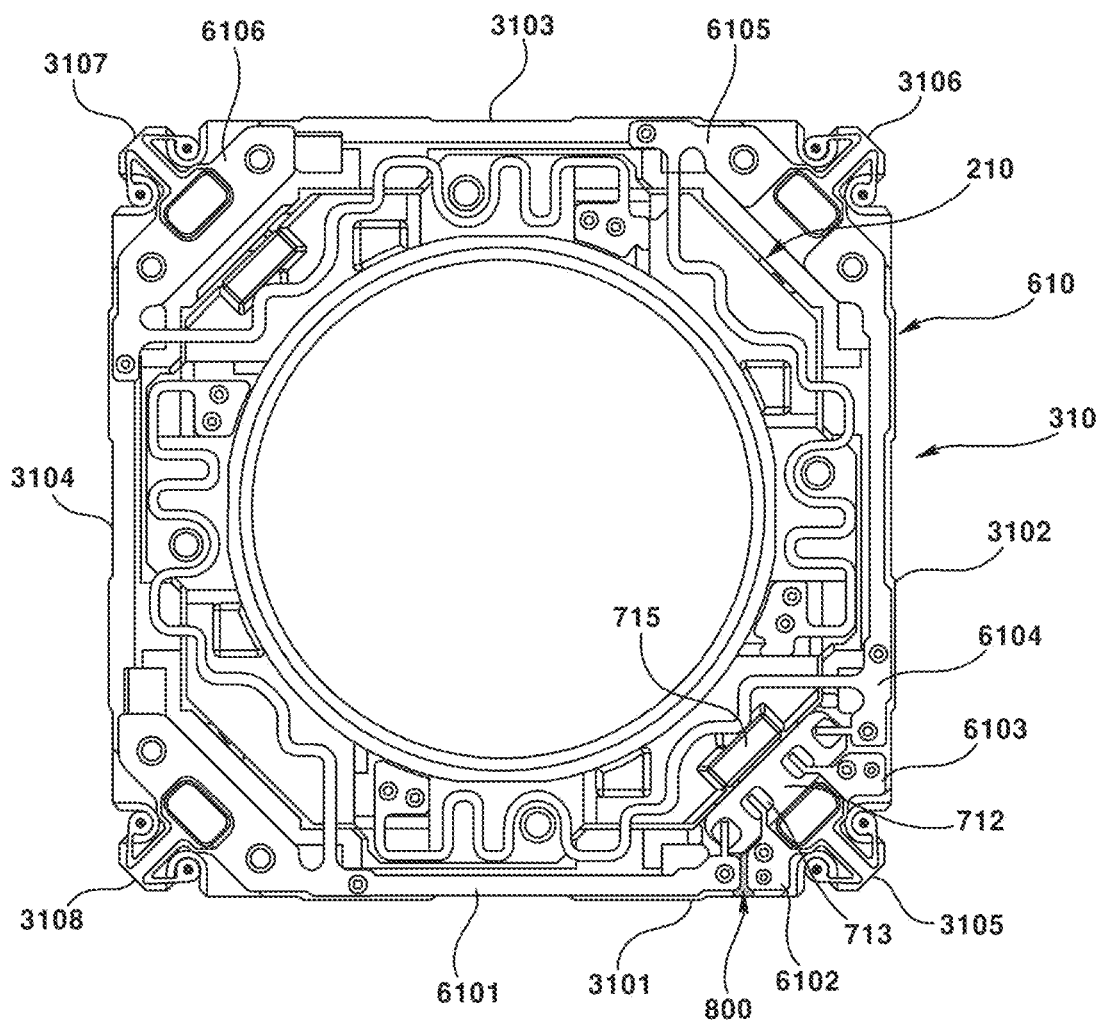
FIG. 7 is a plane view illustrating some elements of a lens driving device according to a second exemplary embodiment of the present invention.
Figure 8:
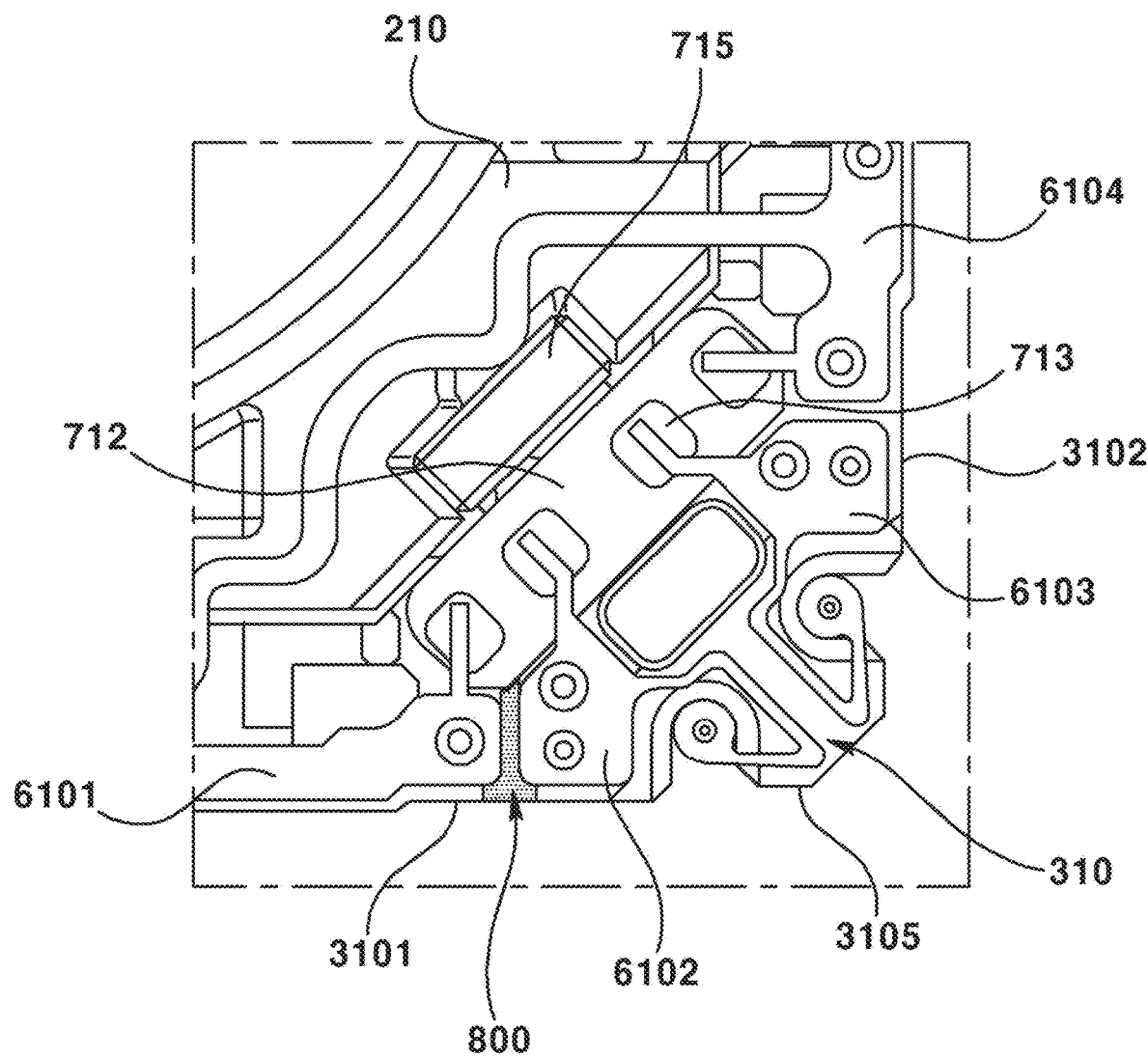
FIG. 8 is an expanded view illustrating some elements of a lens driving device in FIG. 7 according to a second exemplary embodiment of the present invention.
Figure 9:
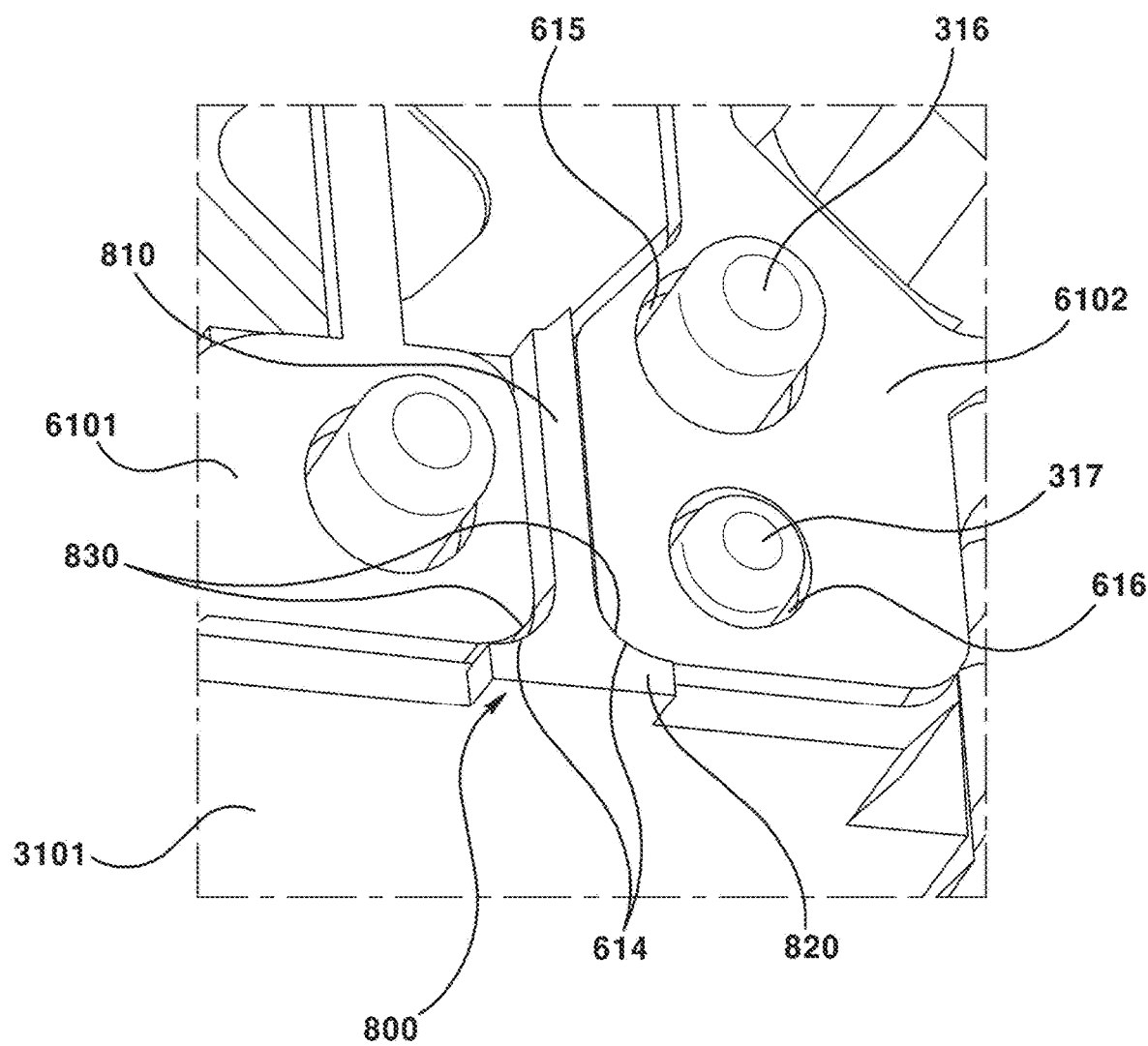
FIG. 9 is a perspective view illustrating some elements of a lens driving device according to a second exemplary embodiment of the present invention.
Figure 10:
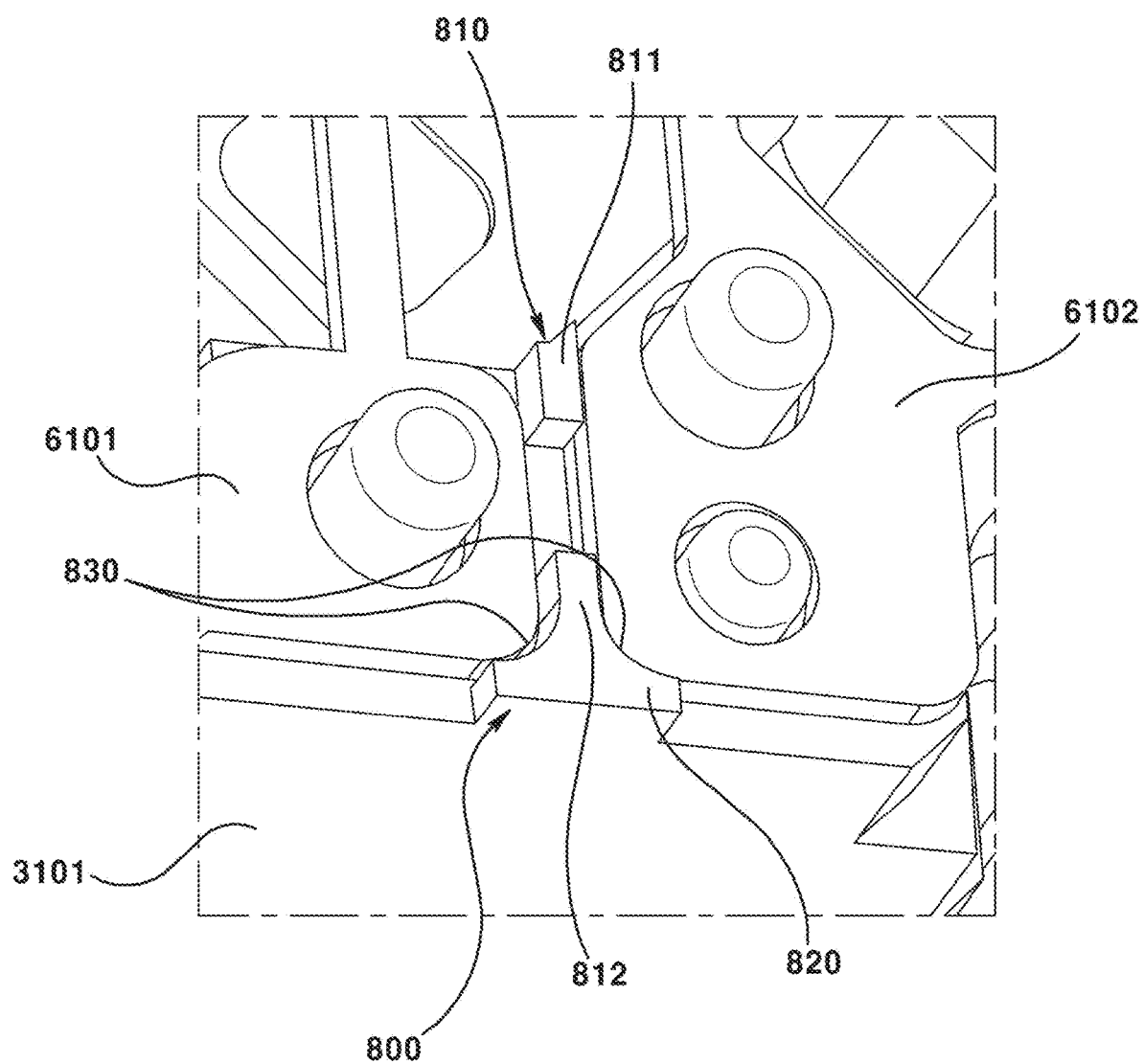
FIG. 10 is a perspective view illustrating some elements of a lens driving device according to a modification of a second exemplary embodiment of the present invention.
Figure 11:
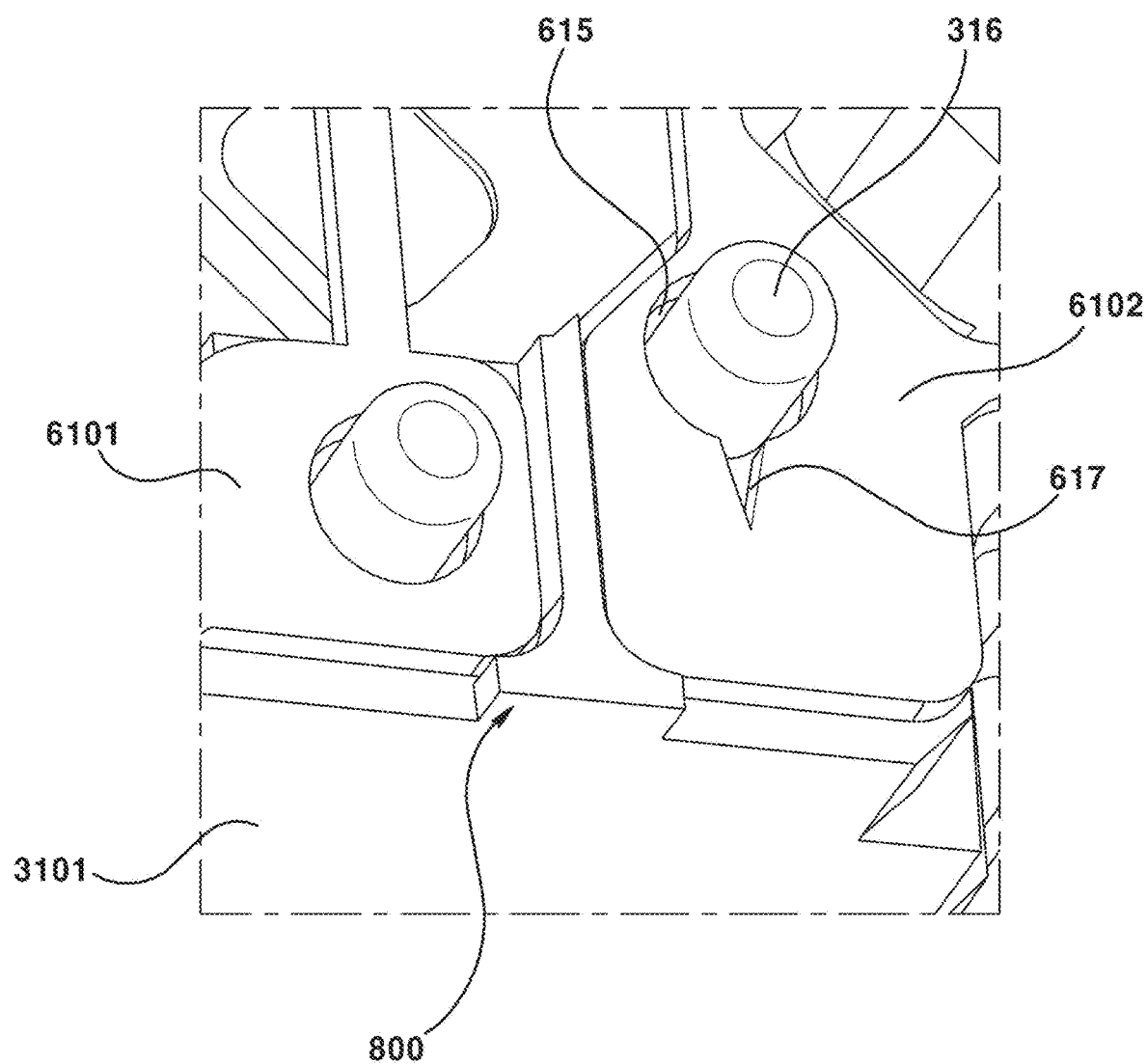
FIG. 11 is a perspective view illustrating some elements of a lens driving device according to another modification of a second exemplary embodiment of the present invention.
Figure 12:
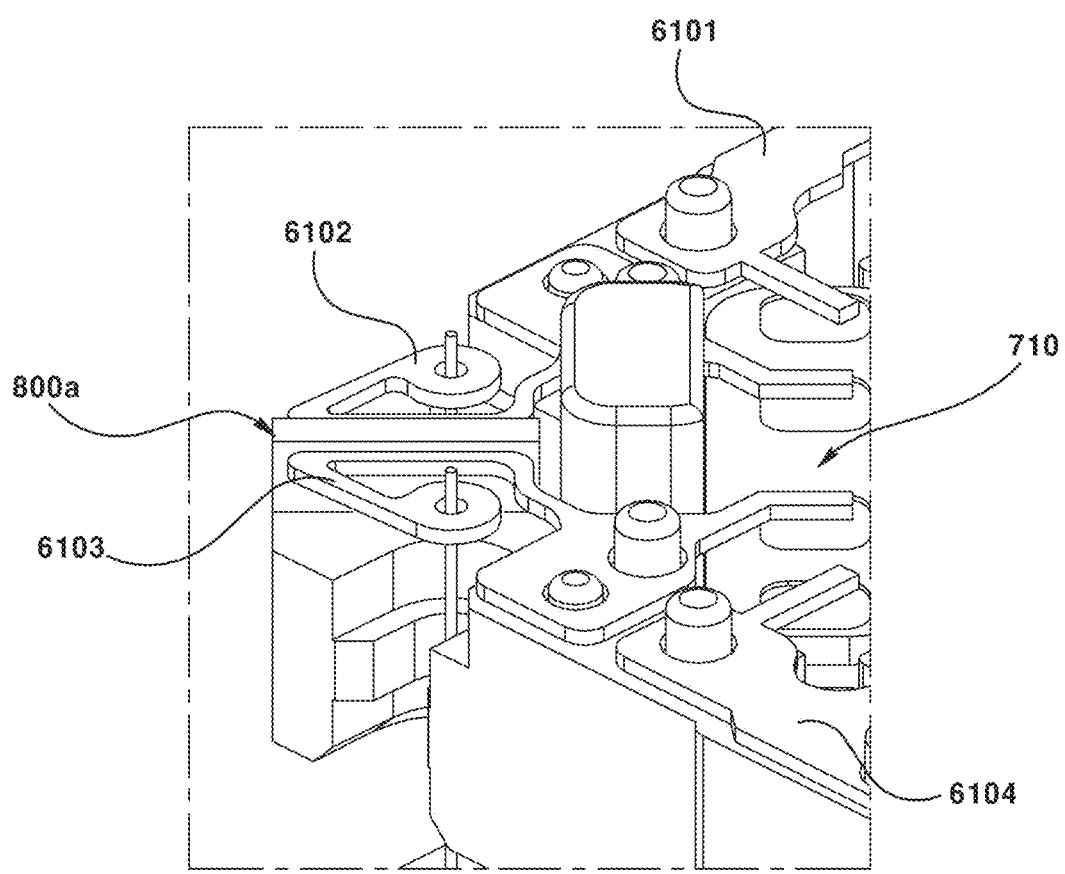
FIG. 12 is a perspective view illustrating some elements of a lens driving device according to still another modification of a second exemplary embodiment of the present invention.

FIG. 7 is a plane view illustrating some elements of a lens driving device according to a second exemplary embodiment of the present invention, FIG. 8 is an expanded view illustrating some elements of a lens driving device in FIG. 7 according to a second exemplary embodiment of the present invention, FIG. 9 is a perspective view illustrating some elements of a lens driving device according to a second exemplary embodiment of the present invention, FIG. 10 is a perspective view illustrating some elements of a lens driving device according to a modification of a second exemplary embodiment of the present invention, FIG. 11 is a perspective view illustrating some elements of a lens driving device according to another modification of a second exemplary embodiment of the present invention, and FIG. 12 is a perspective view illustrating some elements of a lens driving device according to still another modification of a second exemplary embodiment of the present invention.

The lens driving device according to the second exemplary embodiment of the present invention may include a cover member (100), a first mover (200), a second mover (300), a stator (400), a support member (600) and a sensor portion (700). However, any one or more of the cover member (100), the first mover (200), the second mover (300), the stator (400), the support member (600) and the sensor portion (700) may be omitted or changed from the lens driving device according to the present exemplary embodiment. Particularly, the sensor portion (700) may be omitted because the sensor portion (700) is a configuration for auto focus feedback and/or OIS feedback functions.

However, configuration of the lens driving device in the second exemplary embodiment corresponding to that of the first exemplary embodiment of the present invention may be inferably applied using the explanation in the aforementioned first exemplary embodiment. Hereinafter, the second exemplary embodiment will be explained centered on differences from the first exemplary embodiment.

The housing (310) may include a coupling lug (316) and a guide lug (317) spaced apart from the coupling lug (316).

The coupling lug (316) may be protruded from a first surface of the housing (310). To be more specific, the coupling lug (316) may be protruded from an upper surface of the housing (310) to an upper side. The coupling lug (316) may be inserted into a coupling hole (615) of the upper elastic member (610). The coupling lug (316) may be fused while being inserted into the coupling hole (615) of the upper elastic member (610). In this case, the fused coupling lug (316) may fix the upper elastic member (610) to an upper surface of the housing (310).

The guide lug (317) may be spaced apart from the coupling lug (316). The guide lug (317) may be protruded from a first surface of the housing (310). To be more specific, the guide lug (317) may be protruded upwardly from an upper surface of the housing (310). The guide lug (317) may be inserted into a guide hole (616) of the upper elastic member (610). The guide lug (317) may have a smaller diameter than that of the coupling lug (316), for example. Furthermore, height of the guide lug (317) may be lower than that of the coupling lug (316). However, the present invention is not limited thereto. The guide lug (317) may inhibit the upper elastic member (610) fixed to the housing (310) by the coupling lug (316) from rotating.

The upper elastic member may include a round portion (614) formed in a round manner on a corner. At this time, the round portion (614) may be called a "first round portion" in order to distinguish from a round portion (830) of the guide portion (800). The round portion (614) of the upper elastic member (610) may have a curvature corresponding to that of round portion (830) of the guide portion (800).

The upper elastic member (610) may include a coupling hole (615) and a guide hole (616). The coupling hole (615) may be so formed as to vertically pass through a portion of the upper elastic member (610). The coupling hole (615) may be inserted by a coupling lug (316) of housing (310). That is, a width of the coupling hole (615) may be greater than a width of the coupling lug (316) as much as a predetermined size. The coupling hole (615) may have a round shape. However, the present invention is not limited thereto.

The guide hole (616) may be spaced apart from the coupling hole (615). The guide hole (616) may be so formed as to vertically pass through a portion of the upper elastic member (610). The guide hole (616) may be inserted by the guide lug (317) of the housing (310). That is, a width of the guide hole (616) may be greater than a width of the guide lug (317) as much as a predetermined size. The guide hole (616) may have a round shape. However, the present invention is not limited thereto.

The upper elastic member (610) and the housing (310) may be doubly coupled by the coupling between the coupling hole (615) and the coupling lug (316) and the coupling between the guide hole (616) and the guide lug (317) to thereby inhibit the upper elastic member (610) from rotating relative to the housing (310).

The lens driving device according to the second exemplary embodiment of the present invention may include a guide portion (800) disposed at the housing (310) to upwardly protrude between a first upper elastic unit (6101) and a second upper elastic unit (6102). However, the guide portion (800) may be disposed between a third upper elastic unit (6103) and a fourth upper elastic unit (6104). The guide portion (800) may inhibit a short-circuited phenomenon caused by contact between the first upper elastic unit (6101) and the second upper elastic unit (6102) because of being disposed between the first upper elastic unit (6101) used as a conductive line and a second upper elastic unit (6102).

The guide portion (800) may directly contact any one or more of the first upper elastic unit (6101) and the second upper elastic unit (6102). The guide portion (800) may inhibit twist and rotation of the first upper elastic unit (6101) and/or the second upper elastic unit (6102) by directly contacting at least a portion of the first upper elastic unit (6101) and the second upper elastic unit (6102).

The first upper elastic unit (6101) and the second upper elastic unit (6102) may be spaced apart in order to be used as a conductive line of a member electrically conductive with the terminal portion (713) of substrate (712) at the first sensor portion (710). However, each of the first upper elastic unit (6101) and the second upper elastic unit (6102), which are separable elements spaced apart from each other, is too small and minuscule and therefore it is difficult to be fixed to the housing (310). Thus, each of the first upper elastic unit (6101) and the second upper elastic unit (6102) tends to be twisted in the course of being fixed by fusing the coupling lug (316) of the housing (310), and also tends to be twisted in the course of soldering the terminal portion (713) of the substrate (712). In the second exemplary embodiment of the present invention, the guide portion (800) can inhibit the twist and rotation of the first upper elastic unit (6101) and the second upper elastic unit (6102) by being directly contacted on at least a portion of the first upper elastic unit (6101) and the second upper elastic unit (6102).

The guide portion (800) may be disposed at an area where a distance is shortest between the first upper elastic unit (6101) and the second upper elastic unit (6102) in a space between the first upper elastic unit (6101) and the second upper elastic unit (6102).

Furthermore, the guide portion (800) may be disposed only at an area where a distance is shortest between the first upper elastic unit (6101) and the second upper elastic unit (6102) in a space between the first upper elastic unit (6101) and the second upper elastic unit (6102). In this case, the guide portion (800) can inhibit the short-circuit phenomenon by allowing the contact between the first upper elastic unit (6101) and the second upper elastic unit (6102) to be minimized.

A height of the guide portion (800) may be greater than a thickness of the first upper elastic unit (6101) and the second upper elastic unit (6102). However, the present invention is not limited thereto, and the guide portion (800) may be formed with any height as long as mutual contact of the first upper elastic unit (6101) and the second upper elastic unit (6102) can be inhibited, and twist and rotation of the first upper elastic unit (6101) and the second upper elastic unit (6102) can be inhibited.

The guide portion (800) may include a partition portion (810) interposed between the first upper elastic unit (6101) and the second upper elastic unit (6102), and an extension portion (820) extended along a periphery of the housing (310) from an outside end of the partition portion (810).

The partition portion (810) may be interposed between the first upper elastic unit (6101) and the second upper elastic unit (6102). The partition portion (810) may contact any one or more of the first upper elastic unit (6101) and the second upper elastic unit (6102). The partition portion (810) may take a shape corresponding to an opposite surface of the first upper elastic unit (6101) and the second upper elastic unit (6102).

The extension portion (820) may be extended along a periphery of the housing (310) from an outside end of the partition portion (810). That is, the extension portion (820) may form a portion of periphery of the housing (310). The partition portion (810) and the extension portion (820) may be orthogonally formed. However, even in this case, an area where the partition portion (810) and the extension portion (820) meet may be formed in a round shape by the round portion (830).

The guide portion (800) may include a round portion (830) formed at an area where the partition portion (810) and the extension portion (820) meet. At this time, the round portion (830) may be called a 'second round portion' in order to be distinguished from the first round portion (614) of the upper elastic member (610). The second round portion (830) may have a curvature corresponding to that of the first round portion (614). The second round portion (830) can inhibit twist and rotation of the upper elastic member (610) by directly contacting the first round portion (614) on at least a portion thereof.

Although the foregoing has explained that the guide portion (800) is interposed between the first upper elastic unit (6101) and the second upper elastic unit (6102), the position of the guide portion (800) is not limited thereto. That is, the guide portion (800) may be disposed between more than two of the first to sixth elastic units (6101, 6102, 6103, 6104, 6105, 6106), the bottom elastic member (620) and the lateral support member (630).

The lens driving device according to a modification of the second exemplary embodiment of the present invention may be such that the partition portion (810) is divided to a first partition wall (811) and a second partition wall (812), which is different from the lens driving device according to the second exemplary embodiment where the partition portion (810) is integrally formed.

The partition portion (810) in the modification of the second exemplary embodiment of the present invention may include a first partition wall (811) and a second partition wall (812) spaced apart from the first partition wall (811). The first partition wall (811) and the second partition wall (812) may be disposed on both distal ends of the outer portion (611) of the upper elastic member (610). That is, the first partition wall (811) may be disposed at an end of the outer portion (611) at the upper elastic member (610) while the second partition wall (812) may be disposed at the other end of the outer portion (611) at the upper elastic member (610). However, the present invention is not limited thereto, and the partition portion (810) according to the modification of the second exemplary embodiment of the present invention may include a slimming structure, and may be arranged in any structure and in any shape as long as twist and rotation of the first upper elastic unit (6101) and the second upper elastic unit (6102) can be inhibited.

The lens driving device according to another modification of the second exemplary embodiment of the present invention may include a cut-off portion (617). That is, the lens driving device according to another modification of the second exemplary embodiment of the present invention may be different from the previous exemplary embodiment in that a guide hole (616) is omitted and instead, a cut-off portion (617) is formed. To be more specific, the lens driving device according to another modification of the second exemplary embodiment of the present invention may include a coupling lug (316) upwardly protruded from an upper surface of housing (310), a coupling hole (615) so formed as to pass through the upper elastic member (610) and inserted by the coupling lug (316), and a cut-off portion (617) extended from the coupling hole (615) to one side. At this time, when the coupling lug (316) is fused while being inserted into the coupling hole (615), at least one portion of the fused coupling lug (316) may be accommodated in the cut-off portion (617). In this case, the upper elastic member (610) may be inhibited from rotating by the fused portion of the coupling lug (316) accommodated into the cut-off portion (617).

The lens driving device according to still another modification of the second exemplary embodiment of the present invention may include a guide portion (800a) interposed between the second upper elastic unit (6102) and a third upper elastic unit (6103). That is, lens driving device according to still another modification of the second exemplary embodiment of the present invention may be different from the second exemplary embodiment in that the position of the guide portion (800a) is changed. To be more specific, the guide portion (800a) according to still another modification of the second exemplary embodiment of the present invention may be disposed between the second upper elastic unit (6102) and the third upper elastic unit (6103). That is, the guide portion (800a) can inhibit the twist and rotation of the second upper elastic unit (6102) and the third upper elastic unit (6103) by contacting the second upper elastic unit (6102) and the third upper elastic unit (6103). Furthermore, guide portion (800a) can inhibit the short-circuit phenomenon caused by contact between the second upper elastic unit (6102) and the third upper elastic unit (6103).

Hereinafter, a lens driving device according to a third exemplary embodiment of the present invention will be described with reference to the accompanying drawings.

Figure 13:
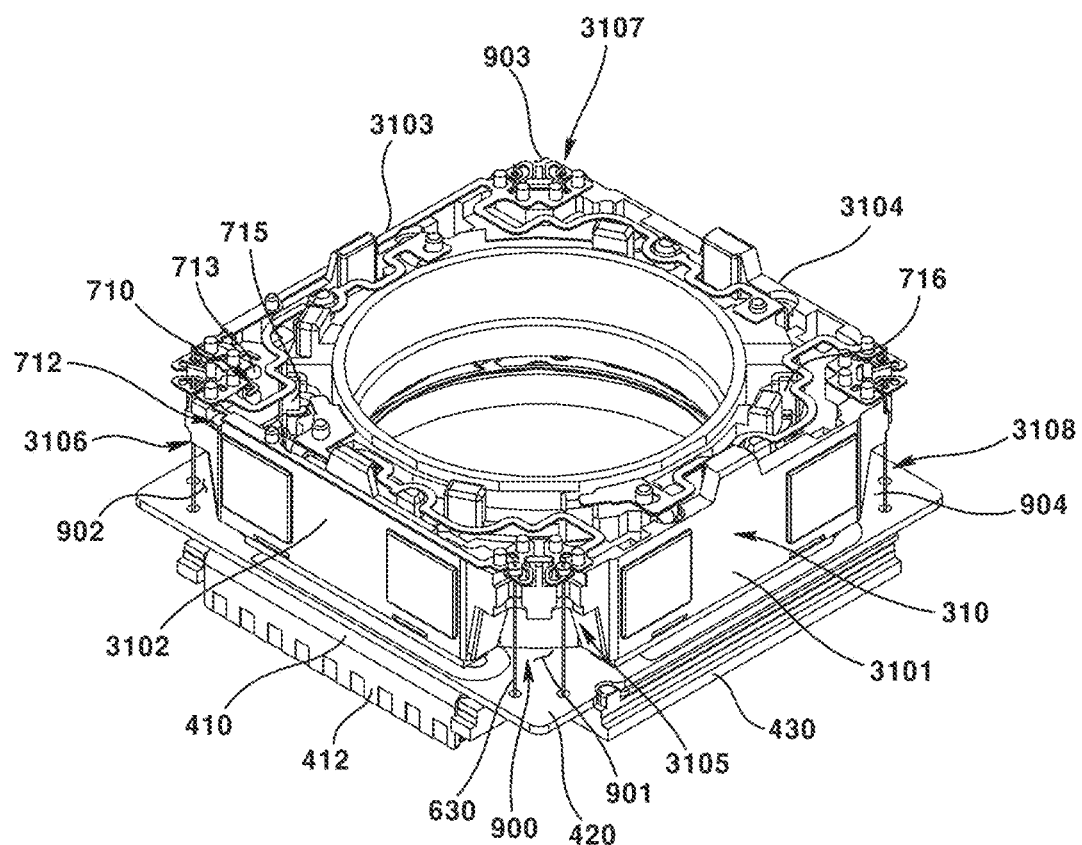
FIG. 13 is a perspective view illustrating a state of a cover member being omitted from a lens driving device according to a third exemplary embodiment of the present invention.
Figure 14:
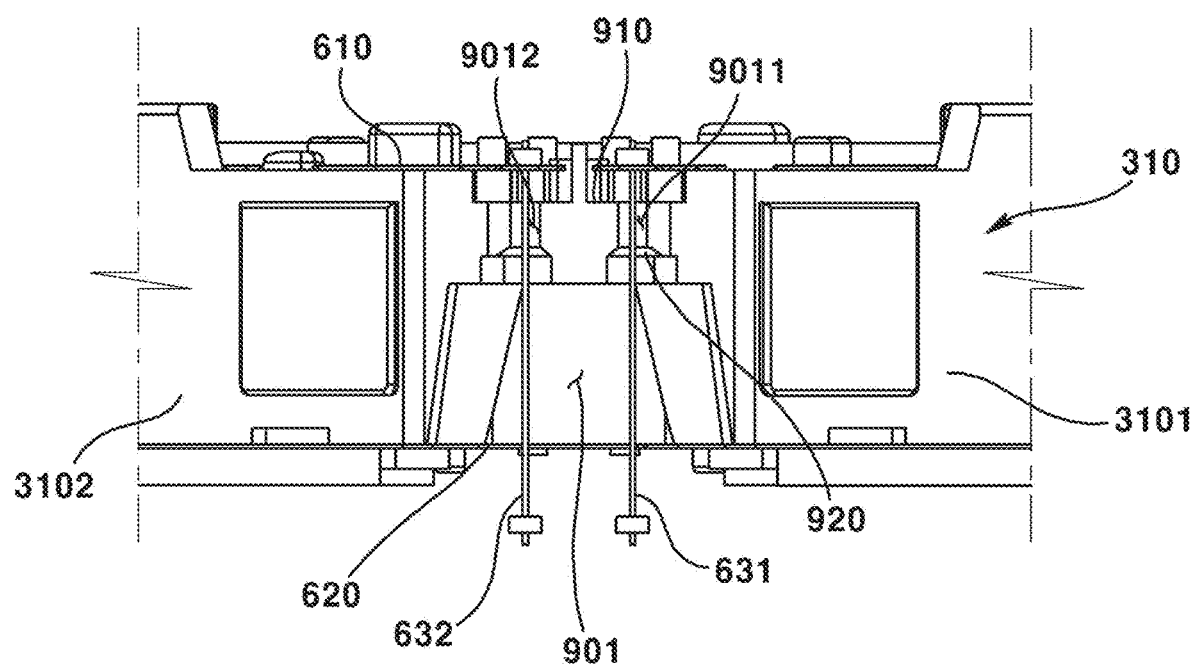
FIG. 14 is a lateral view illustrating a state of some elements being omitted as seen of FIG. 13 from a lateral surface.
Figure 15:
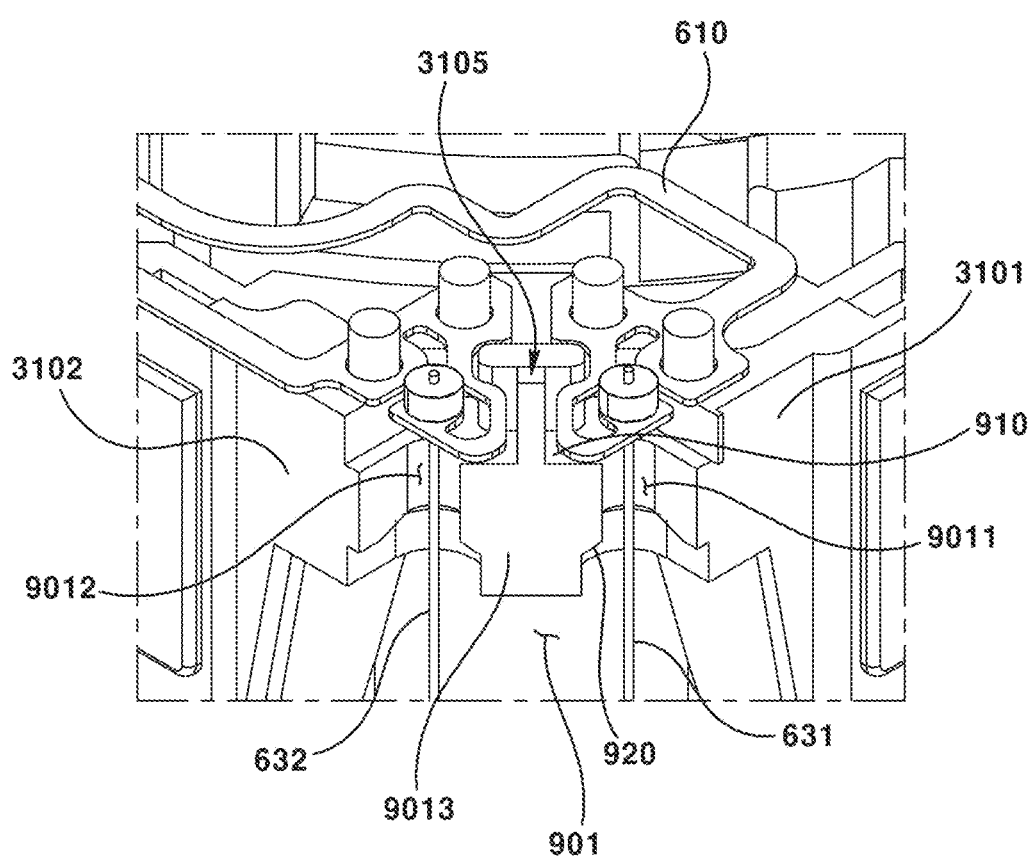
FIG. 15 is an expanded view illustrating a state of some elements being expanded in FIG. 13.
Figure 16:
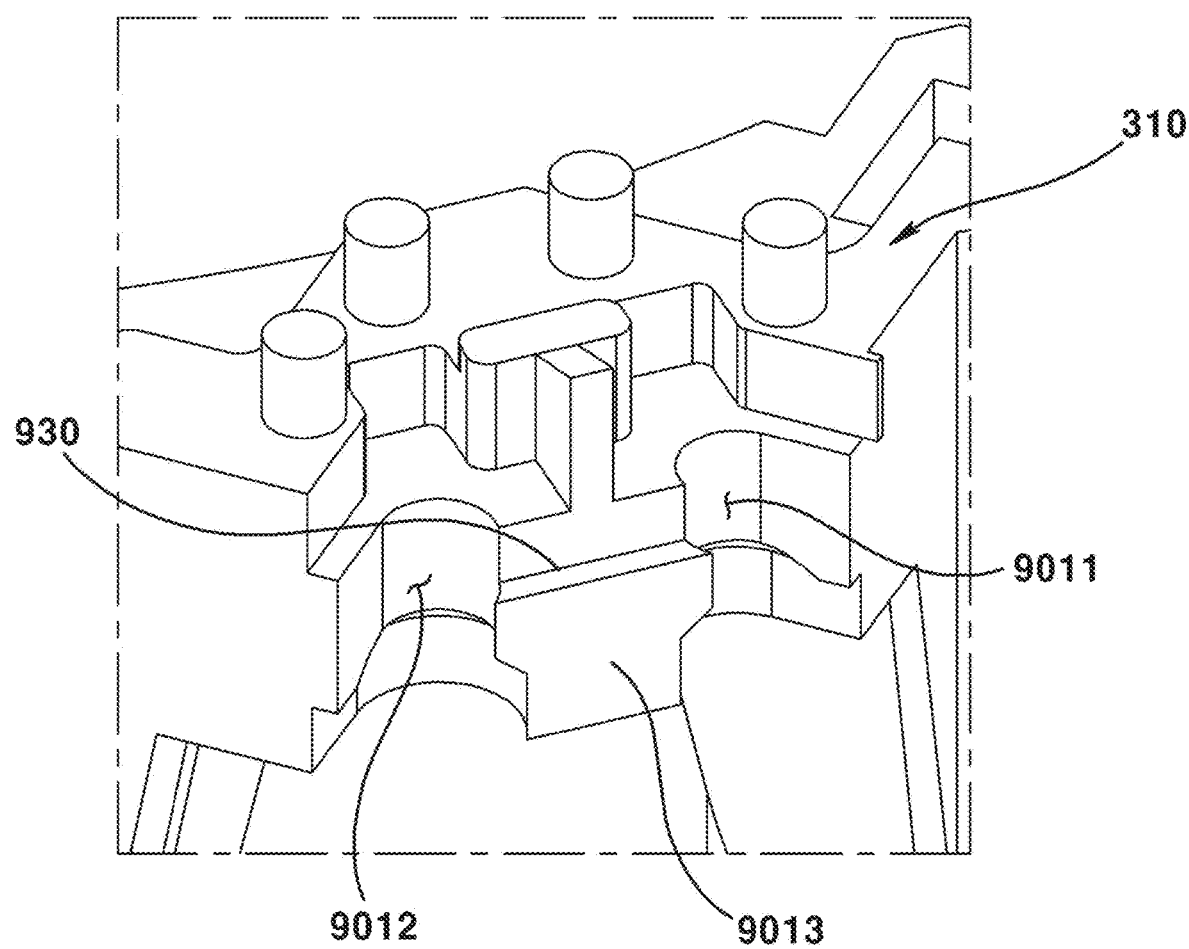
FIG. 16 is an expanded view illustrating some elements of a lens driving device according to a modification of a third exemplary embodiment of the present invention.
Figure 17:
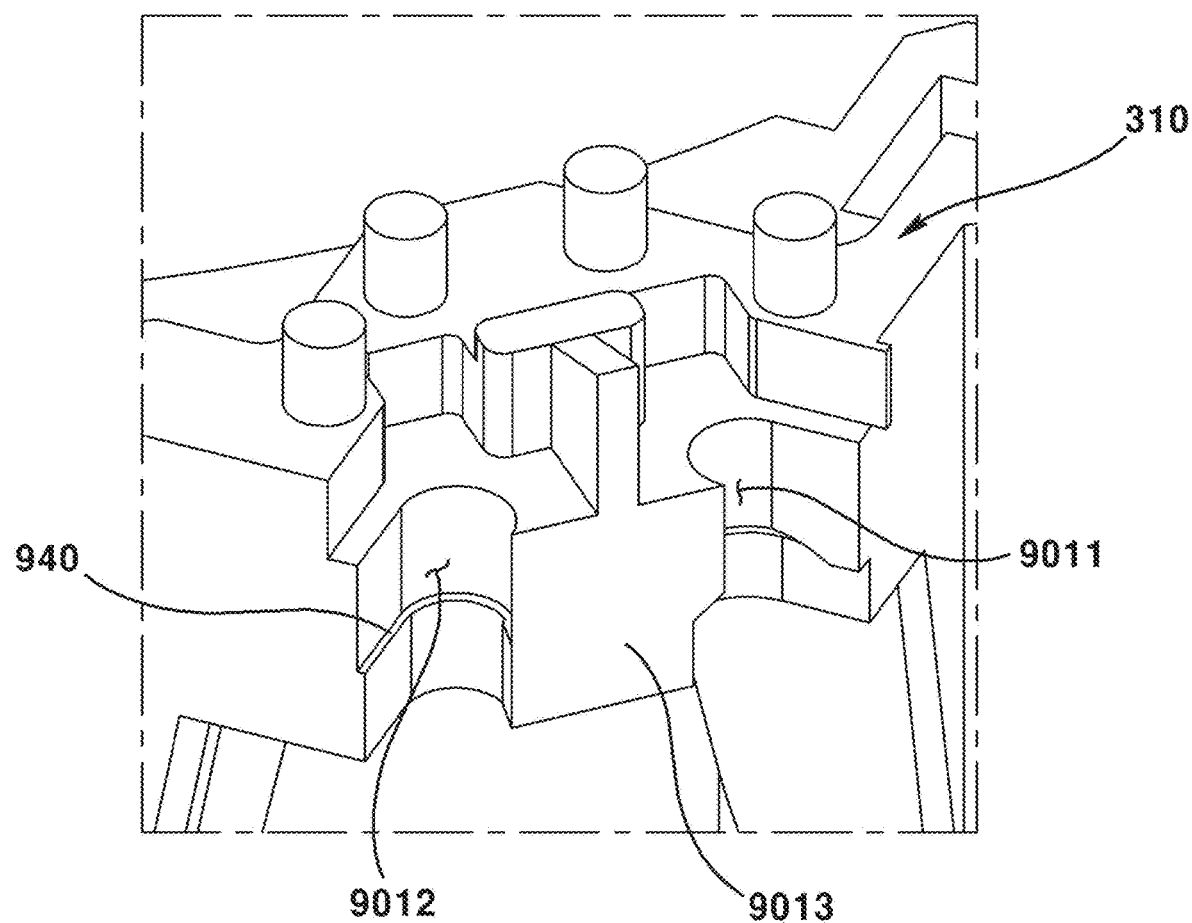
FIGS. 17 and 18 are expanded views illustrating some elements being expanded from a lens driving device according to another modification of a third exemplary embodiment of the present invention.
Figure 18:
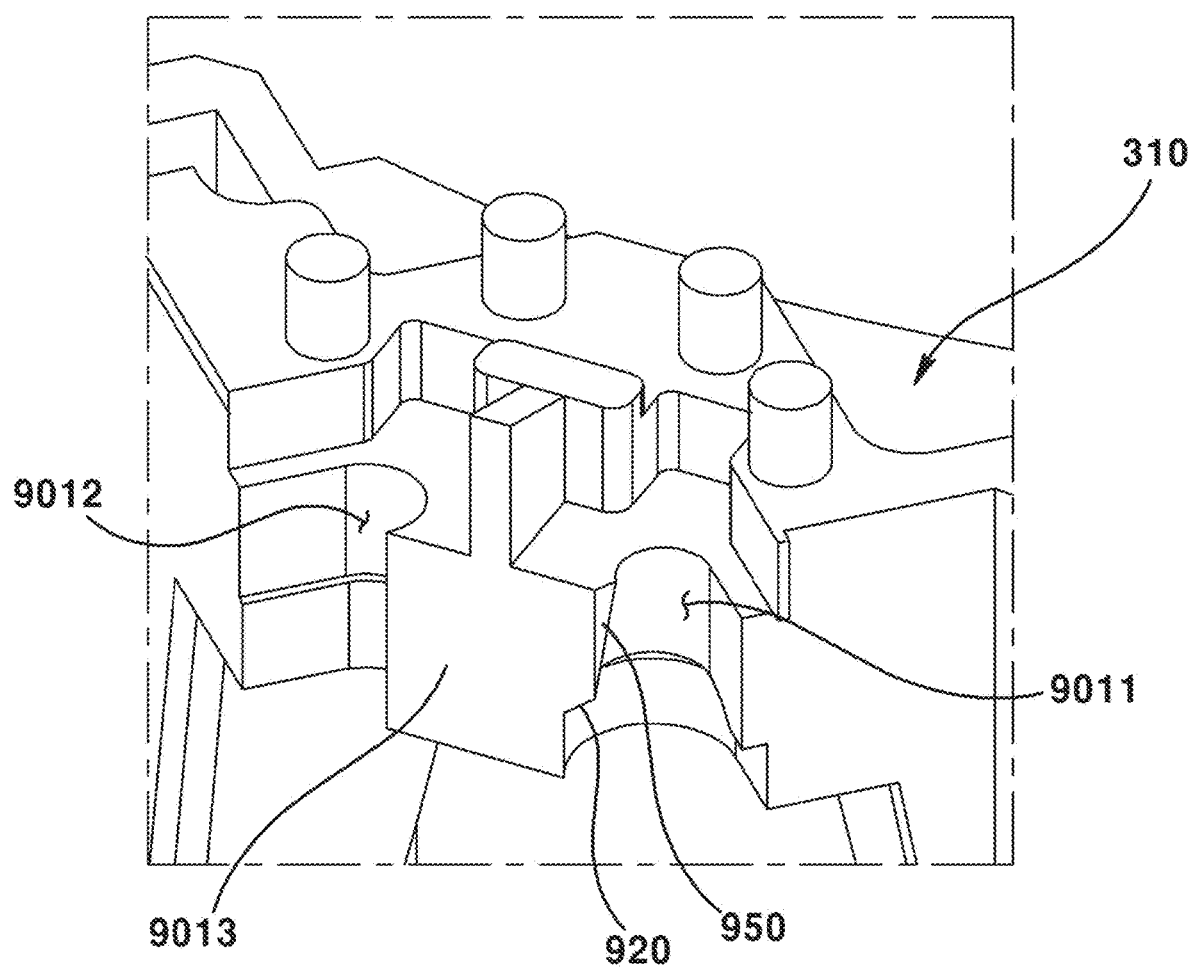

FIG. 13 is a perspective view illustrating a state of a cover member being omitted from a lens driving device according to a third exemplary embodiment of the present invention, FIG. 14 is a lateral view illustrating a state of some elements being omitted as seen of FIG. 13 from a lateral surface, FIG. 15 is an expanded view illustrating a state of some elements being expanded in FIG. 13, FIG. 16 is an expanded view illustrating some elements of a lens driving device according to a modification of a third exemplary embodiment of the present invention, and FIGS. 17 and 18 are expanded views illustrating some elements being expanded from a lens driving device according to another modification of a third exemplary embodiment of the present invention.

The lens driving device according to a third exemplary embodiment of the present invention may include a cover member (100), a first mover (200), a second mover (300), a stator (400), a support member (600) and a sensor portion (700). However, any one or more of the cover member (100), the first mover (200), the second mover (300), the stator (400), the support member (600) and the sensor portion (700) may be omitted or changed from the lens driving device according to the present exemplary embodiment. Particularly, the sensor portion (700) may be omitted because the sensor portion (700) is a configuration for auto focus feedback and/or OIS feedback functions.

However, configuration of the lens driving device in the third exemplary embodiment corresponding to that of the first exemplary embodiment of the present invention may be inferably applied using the explanation in the aforementioned first exemplary embodiment. Hereinafter, the third exemplary embodiment will be explained centered on differences from the first exemplary embodiment.

The lens driving device according to the third exemplary embodiment of the present invention may include a support member receptor (900) disposed at the housing (310) to accommodate at least a portion of the lateral support member (630).

The first and second lateral support portions (631, 632) accommodated into the support member receptor (900) may contact a damper portion (not shown) integrally coated on the support member receptor (900). That is, the first and second lateral support portions (631, 632) accommodated into the support member receptor (900) may be integrally coated with the damper. In other words, the first and second lateral support portions (631, 632) accommodated into the support member receptor (900) may be coated with the damper through a single process. That is, working hours can be shortened over a case where the damper is coated on each of the first and second lateral support portions (631, 632). The damper according to the present exemplary embodiment may be coated in order to control resonance of the lateral support member (600).

The first and second lateral support portions (631, 632), when viewed from a lateral side of the housing (310), may be so arranged as to allow an area accommodated into the support member receptor (900) of the first and second lateral support portions (631, 632) to be viewed altogether. That is, the support member receptor (900), when viewed from a lateral side of the housing (310), may be so arranged as to expose all the first and second lateral support portions (631, 632). In other words, the first and second lateral support portions (631, 632) may be inserted into a single hole altogether at the same time. When the first and second lateral support portions (631, 632) are simultaneously viewed as explained above, the damper can be coated with a single process, and the damper can be cured or hardened through a single process using a UV irradiation. That is, loss of working hours for damping operation can be reduced and a process for curing the damper can be simplified by the third exemplary embodiment of the present invention.

The support member receptor (900) may include a staircase portion (910) formed by being relatively more protruded at a bottom surface over at an upper surface. At this time, the staircase portion (910) may be called a 'first staircase portion (910)' in order to distinguish from staircases (930, 840, described later). The staircase portion (910) may be coated with the damper portion. That is, the staircase portion (910) may be so formed as to inhibit the damper from flowing down. The support member receptor (900) may minimize the flowing-down of damper using the staircase portion (910). The staircase portion (910) may be formed at an open area of the housing (310) lest a damper solution be permeated downwardly. The damper solution can be captured at an area passed by the lateral support member (630) using the staircase portion (910).

The support member receptor (900) may include a first receptor part (901) disposed at a first edge portion (3105) of the housing (310), a second receptor part (902) disposed at a second edge portion (3106), a third receptor part (903) disposed at a third edge portion (3107) and a fourth receptor part (904) disposed at a fourth edge portion (3108). At this time, the first to eighth lateral support portions (631, 632, 633, 634, 635, 636, 637, 638) may be arranged, two each at the first to fourth receptor parts (901, 802, 803, 804). That is, the first and second lateral support portions (631, 632) may be disposed at the first receptor part (901), the third and fourth receptor parts (633, 634) may be disposed at the second receptor part (902), the fifth and sixth lateral support portions (635, 636) may be disposed at the third receptor part (903) and the seventh and eighth lateral support portions (637, 638) may be disposed at the fourth receptor part (904). That is, eight lateral support portions may be accommodated into four receptor parts.

The first receptor part (901) may be formed with a first receptor groove (9011) accommodated by the first lateral support portion (631), and a second receptor groove (9012) accommodated by the second lateral support portion (632). At this time, the support member receptor (900) may include a partition wall (9013) interposed between the first receptor groove (9011) and the second receptor groove (9012). At this time, at least a portion of an outer peripheral surface of the partition wall (9013) may be positioned on a farther inside than the first and second lateral support portions (631, 632) or may be positioned on a same planar surface, through which the first and second lateral support portions (631, 632) can be simultaneously contacted to the damper coated on the partition wall (9013).

The first receptor groove (9011) may include a slant portion (920) where a width is gradually broadened from an upper side to a bottom side on at least a portion of the first receptor groove (9011). At this time, the slant portion (920) may be called a 'first slant portion (920)' in order to distinguish from a slant portion (950, described later). The slant portion (920) may be so formed as to minimize the flowing-down of damper along an outer peripheral surface of housing (310) forming the first receptor groove (9011). That is, the slant portion (920) can minimize the flowing-down of damper flowing down along the outer peripheral surface of housing (310) that forms the first receptor groove (9011).

The lens driving device according to a modification of the third exemplary embodiment of the present invention may further include a staircase portion (930) formed at an outer peripheral surface of the partition wall (9013). At this time, the staircase portion (930) may be called a 'second staircase portion (930)' in order to distinguish the previously mentioned first staircase portion (910). The staircase portion (930) may be formed on an outer peripheral surface of partition wall (9013). The staircase portion (930) may be so formed as to allow a bottom surface to be relatively more protruded than an upper surface. That is, the staircase portion (930) may be so formed in a shape as to minimize the flowing-down of damper to an area where the damper is coated. The outer peripheral surface of partition wall (9013) corresponding to an upper side of the staircase portion (930) may be disposed at a farther inside than an imaginary plane formed by the first and second lateral support portions (631, 632), whereby all the first and second lateral support portions (631, 632) can be contacted to the damper disposed at an upper side of the staircase portion (930).

The lens driving device according to another modification of the third exemplary embodiment of the present invention may further include a staircase portion (940) formed at the second receptor groove (9012). At this time, the staircase portion (940) may be called a 'third staircase portion (940)' in order to distinguish the previously mentioned first and second staircase portions (910, 830). The staircase portion (940) may be so formed as to allow a bottom surface to be relatively more protruded than an upper surface. That is, the staircase portion (940) may be so formed in a shape as to minimize the flowing-down of damper coated on the upper surface.

Furthermore, lens driving device according to another modification of the third exemplary embodiment of the present invention may further include a slant portion (950) formed at the first receptor groove (9011). At this time, the slant portion (950) may be called a 'second slant portion (950)' in order to distinguish from the previous first slant portion (920). The second slant portion (950) may be so formed as to allow a width or a diameter to grow larger from an upper side to a bottom side. The second slant portion (950) may be extended from an upper end of the first receptor groove (9011) to the first slant portion (920). The second slant portion (950) may inhibit the damper solution from flowing down in terms of processing by forming an upper end to be narrower, and forming a bottom surface to be broader.

Hereinafter, operation of camera module according to an exemplary embodiment of the present invention will be described.

First, the auto focus function of camera module according to an exemplary embodiment will be described. When a power is supplied to the AF driving coil (220), the AF driving coil (220) performs a movement relative to the driving magnet (320) in response to the electromagnetic interaction between the AF driving coil (220) and the driving magnet (320). At this time, the bobbin (210) coupled by the AF driving coil (220) integrally moves with the AF driving coil (220). That is, the bobbin (210) coupled to an inside of the lens module vertically moves to the housing (310). The vertical movement of bobbin (210) results in the movement in which the lens module comes near to the image sensor or distances from the image sensor, whereby the focus control can be performed to an object by supplying a power to a coil on the AF driving coil (220) according to the exemplary embodiment of the present invention.

Meantime, an auto focus feedback may be applied in order to implement a more accurate realization of auto focus function in the camera module according to the present invention. The first sensor formed on the housing (310) and provided as a Hall sensor detects a magnetic field of the sensing magnet (715) fixed to the bobbin (210). Hence, when the bobbin (210) performs a relative movement to the housing (310), an amount of magnetic field detected by the first sensor may be changed. The first sensor detects the movement to z axis direction or the position of the bobbin (210) using the thus-mentioned method and transmits a received detection value to the controller. The controller determines whether to perform an additional movement to the bobbin (210) through the received detection value. These series of processes are generated in real time, whereby the auto focus function of the camera module according to the present exemplary embodiment can be more accurately performed through the auto focus feedback.

Now, the OIS function of camera module according to the exemplary embodiment will be described. When a power is supplied to the OIS driving coil (422), the driving magnet (320) performs a movement relative to the OIS driving coil (422) through the electromagnetic interaction between the OIS driving coil (422) and the driving magnet (320). At this time, the housing (310) coupled by the driving magnet (320) integrally moves with the driving magnet (320). That is, the housing (310) horizontally moves relative to the base (430). However, at this time, the housing (310) may be induced of tilt relative to the base (430). At this time, the bobbin (210) also moves integrally with the housing (310). Hence, the aforementioned movement of the housing (310) results in the lens module moving to a direction relative to the image sensor parallel to a direction where the image sensor is placed, such that the OIS function can be implemented by supplying a power to the OIS driving coil (422) in the present exemplary embodiment.

Meantime, in order to perform a more accurate realization of OIS function on the camera module according to the present exemplary embodiment, an OIS feedback may be applied. The one pair of second sensors (720) mounted on the base (430) and provided in the form of Hall sensor detects a magnetic field of a magnet at the driving magnet (320) fixed to the housing (310). Thus, when the housing (310) performs a relative movement to the base (430), the amount of magnetic field detected by the second sensor (720) can be changed. The pair of second sensors (720) detects the horizontal movement (x axis and y axis directions) or the position of the housing (310) using the thus-mentioned method and transmits a received detection value to the controller. The controller determines whether to perform an additional movement to the housing (310) through the received detection value. These series of processes are generated in real time, whereby the OIS function of the camera module according to the present exemplary embodiment can be more accurately performed through the OIS feedback.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device comprising:
a base;
a housing disposed on the base;
a bobbin disposed in the housing;
a first coil disposed on the bobbin;
a first magnet disposed on the housing;
a second coil disposed on the base;
an upper elastic member connecting the housing and the bobbin;
a wire coupled with the upper elastic member; and
a damper contacted with the wire,
wherein the housing comprises a groove disposed with the wire,
wherein the groove of the housing is opened outside,
wherein the housing comprises an upper surface disposed with the upper elastic member, a first surface facing a same direction with the upper surface and disposed lower than the upper surface, and a first staircase portion formed by the upper surface and the first surface,
wherein at least a portion of the damper is disposed between the first surface of the housing and the upper elastic member,
wherein the wire is spaced apart from the housing, and
wherein the first staircase portion of the housing is coated with the damper.

2. The lens driving device of claim 1, wherein the housing comprises first to fourth corner areas,
wherein the groove of the housing comprises first and second grooves disposed on the first corner area, and
wherein the wire comprises a first wire disposed on the first groove of the housing, and a second wire disposed on the second groove of the housing.

3. The lens driving device of claim 2, wherein the housing comprises a partition wall disposed between the first groove and the second groove, and
wherein the partition wall comprises a second staircase portion formed by a lower portion more protruding than an upper portion at an outer lateral surface of the partition wall.

4. The lens driving device of claim 3, wherein at least a portion of the outer lateral surface of the partition wall is disposed inner than the first and second wires or is disposed on a same plane.

5. The lens driving device of claim 2, wherein the wire comprises third to eighth wires,
wherein the third and fourth wires are disposed on the second corner area,
wherein the fifth and sixth wires are disposed on the third corner area, and
wherein the seventh and eighth wires are disposed on the fourth corner area.

6. The lens driving device of claim 1, wherein the first surface of the housing is directly connected with an upper end of the groove of the housing, and
wherein the damper is captured at an area passed by the wire using the first staircase portion of the housing.

7. The lens driving device of claim 1, wherein, when viewed from outside, the first staircase portion of the housing is disposed between the upper elastic member and the groove of the housing.

8. The lens driving device of claim 1, wherein the groove of the housing comprises a slant portion whose width increases from an upper end to a lower end in at least a portion of the groove of the housing.

9. The lens driving device of claim 1, wherein the groove of the housing comprises a third staircase portion steppedly formed so that a width of an upper portion of the groove is greater than a width of a lower portion of the groove.

10. The lens driving device of claim 1, comprising:
a second magnet disposed on the bobbin;
a substrate disposed on the housing; and a sensor disposed on the substrate and configured to sense the second magnet,
wherein the upper elastic member comprises first to fourth upper elastic units electrically connecting the substrate and the wire.

11. The lens driving device of claim 1, wherein a portion of the damper is disposed on the groove of the housing.

12. The lens driving device of claim 1, wherein the damper is disposed lower than the upper elastic member.

13. The lens driving device of claim 1, wherein the upper elastic member comprises a first upper elastic unit and a second upper elastic unit spaced apart from each other,
wherein the housing comprises a first protrusion protruding from the upper surface of the housing,
wherein the first protrusion is disposed between the first upper elastic unit and the second upper elastic unit in a first direction perpendicular to an optical axis direction, and
wherein a distance between the first upper elastic unit and the second upper elastic unit in the first direction corresponds to a width of the first protrusion taken in the first direction.

14. A camera module, comprising:
a Printed Circuit Board PCB;
an image sensor coupled to the PCB;
the lens driving device of claim 1 disposed above the PCB; and
a lens coupled to the bobbin.

15. An optical device, comprising:
a main body;
the camera module of claim 14 disposed on the main body; and
a display portion disposed on the main body and outputting an image photographed by the camera module.

16. A lens driving device comprising:
a base;
a housing disposed on the base;
a bobbin disposed in the housing;
a first coil disposed on the bobbin;
a first magnet disposed on the housing;
a second coil disposed on the base;
an upper elastic member connecting the housing and the bobbin;
a lateral support member coupled with the upper elastic member; and
a damper contacted with the lateral support member,
wherein the housing comprises a support member receptor through which the lateral support member passes,
wherein the housing comprises an upper surface disposed with the upper elastic member, a first surface facing a same direction with the upper surface and disposed lower than the upper surface, and a first staircase portion formed by the upper surface and the first surface,
wherein the first staircase portion of the housing is disposed higher than the support member receptor of the housing,
wherein at least a portion of the damper is disposed between the support member receptor of the housing and the upper elastic member,
wherein the lateral support member is spaced apart from the housing, and
wherein the first staircase portion of the housing is coated with the damper.

17. The lens driving device of claim 16, wherein the support member receptor of the housing comprises a groove opened outside.

18. The lens driving device of claim 17, wherein the groove of the housing comprises first and second grooves disposed on a first corner area of the housing, and
wherein the lateral support member comprises a first wire disposed on the first groove of the housing, and a second wire disposed on the second groove of the housing.

19. The lens driving device of claim 18, wherein the housing comprises a partition wall disposed between the first groove and the second groove, and
wherein the partition wall comprises a second staircase portion formed by a lower portion more protruding than an upper portion at an outer lateral surface of the partition wall.

20. The lens driving device of claim 16, wherein the damper is captured at an area passed by the lateral support member using the first staircase portion of the housing.

\* \* \* \* \*